United States Patent

Sato et al.

[11] Patent Number: 5,969,601
[45] Date of Patent: Oct. 19, 1999

[54] APPARATUS AND METHOD FOR PREDICTING REPLACEMENT TIMING OF ENGINE LUBRICATING OIL

[75] Inventors: Fumihide Sato; Kenji Mihara, both of Oyama, Japan

[73] Assignee: Komatsu Ltd., Tokyo, Japan

[21] Appl. No.: 09/146,811

[22] Filed: Sep. 4, 1998

[30] Foreign Application Priority Data

Sep. 5, 1997 [JP] Japan .................................. 9-256182

[51] Int. Cl.⁶ .................................................. B60Q 1/00
[52] U.S. Cl. .................. 340/450.3; 340/438; 340/457.4; 123/196 S; 701/30; 73/112.5; 73/53.05
[58] Field of Search .............................. 340/450.3, 438, 340/457.4; 123/196 S; 701/30; 73/117.3, 53.05

[56] References Cited

U.S. PATENT DOCUMENTS

| | | | |
|---|---|---|---|
| 4,506,337 | 3/1985 | Yasuhara | 701/30 |
| 4,533,900 | 8/1985 | Muhlberger et al. | 340/457.4 |
| 4,742,476 | 5/1988 | Schwartz et al. | 701/30 |
| 4,970,492 | 11/1990 | King | 340/450.3 |
| 5,571,950 | 11/1996 | Waddoups et al. | 73/53.05 |
| 5,750,887 | 5/1998 | Schricker | 73/117.3 |

FOREIGN PATENT DOCUMENTS 60-44490  10/1985  Japan .

Primary Examiner—Jeffery A. Hofsass
Assistant Examiner—Ashok Mannaua
Attorney, Agent, or Firm—Sidley & Austin

[57] ABSTRACT

An apparatus and method for predicting a lubricating oil replacement time for an engine by precisely predicting a total acid value and/or an amount of soot in a lubricating oil and by displaying an accurate time which will elapse before a required lubricating oil replacement. Accurate prediction of lubricating oil replacement prevents engine seizing and other damage and avoids wasteful replacement of otherwise useful lubricating oil.

20 Claims, 16 Drawing Sheets

APPARATUS AND METHOD FOR PREDICTING REPLACEMENT TIMING OF ENGINE LUBRICATING OIL

FIELD OF THE INVENTION

The present invention relates to an apparatus and a method for predicting a time for replacing an engine lubricating oil by predicting the time for replacing the lubricating oil for lubricating a crank shaft, a cam shaft, a pump, a bearing or the like of the engine in order to prevent the engine from being damaged.

BACKGROUND OF THE INVENTION

Conventionally in a construction machine, engine lubricating oil replacement is based on an engine operating time as measured by a hour meter. A user must compare the measured engine operating time to a replacement operating time defined by the construction machine manufacturer. In a vehicle or the like, replacement is performed on the basis of a period of time specified by the vehicle manufacturer or a traveling distance. This method, however, has a problem that a lubricating oil which remains useful may be wastefully replaced with new oil depending upon a condition for use or that lubricating oil subject to severe conditions may not be immediately replaced with new oil, which reduces the working life of the engine.

Accordingly, as a method of deciding a time for replacing a lubricating oil of an engine, there is provided Japanese Patent Publication No. 60-44490 of 1985. In this publication, there is disclosed an apparatus for replacing an engine oil comprising a sensor for detecting the number of revolutions of an engine, a sensor for detecting a load, and a calculating section for calculating an amount of tramp soot (hereinafter "soot") within the oil on the basis of output values of these sensors. The Japanese reference further discloses an apparatus for integrating and storing the amount of soot, in which an alarm is produced in order to instruct an operator to replace the oil when the integrated total amount of soot in oil exceeds a predetermined amount.

The working life of lubricating oil commonly exhibits the following characteristics. In one case, increased engine wear is caused by an increase of oil viscosity due to the soot contained in the oil and in addition to a decrease of oil alkali value. In the other case, increased engine wear is caused by a bearing seizing to an increase of the total acid value of the lubricating oil in addition to an increase of sludge caused by an increased acidity in the lubricating oil.

Thus, the invention disclosed in Japanese Patent Publication No. 60-44490 for detecting soot has the following problems:

(1) if an engine is radically loaded, as in a construction machine, the amount of smoke from the engine is rapidly increased, consequently the amount of soot in the engine lubricating oil sharply changes, thereby affecting the ability to accurately predict the amount of soot content within the lubricating oil;

(2) if a load on an engine is greatly changed as in a construction machine, a large capacity calculating section to calculate a soot content within an engine lubricating oil is needed and a control unit cannot commonly follow the variation, thereby again affecting the ability to accurately predict the amount of soot content within the lubricating oil;

(3) the amount of soot changes depending upon an operating condition (e.g., a temperature of the lubricating oil or the like) of the engine, further impeding the ability to accurately predict the content of soot within the lubricating oil; and (4) it is difficult to grasp the total acid value in the engine lubricating oil, thus also affecting the ability to accurately predict the lubricating oil soot content.

SUMMARY OF THE INVENTION

In view of these problems in the prior art, it is an object of the present invention to provide an apparatus and method for predicting an engine lubricating oil replacement time by precisely predicting an increase of a total lubricating oil acid value and/or an increase of a lubricating oil soot content and for accurately displaying the lubricating oil replacement time. The lubricating oil may be used for lubricating a crank shaft, a cam shaft, a pump, a bearing and the like of an engine in order to prevent the engine from seizing and being damaged.

The present invention is directed to an engine lubricating oil replacement time predicting apparatus for predicting an engine lubricating oil replacement time, the lubricating oil lubricating a piston, a crank bearing, a bearing for a connecting bar and the like. The prediction corresponds to a rotary speed of the engine and a load applied on the engine. According to a first aspect, an apparatus for predicting a replacement time for an engine lubricating oil comprises an engine rotary speed sensor, an engine load sensor, a total acid value storing means, an operating load frequency calculating means, a total acid value calculating means, and a total acid value displaying means. The engine rotary speed sensor detects a rotary speed of the engine, and the engine load sensor detects an engine load. The total acid value storing means premeasures and stores an increase of a total acid value per unit time in the lubricating oil corresponding to an engine rotary speed and engine load on a test bench. The operating load frequency calculating means calculates and stores an engine load frequency for a set period after receipt of signals from the engine rotary speed sensor and the engine load sensor. The total acid value calculating means calculates an increase of a total acid value for a period set based on both information stored in the total acid value storing means and the engine load frequency stored in the operating load frequency calculating means. The total acid value displaying means displays the time when a sum of the total acid value increases exceeds a threshold value as a result of integrating the determined increases of the total acid value or that the sum exceeds the threshold value after an elapse of a predetermined time.

According to this configuration, on a test bench both the engine rotary speed and the load on the engine are fixed during continuous running for 20 hours, for example, to measure a change in the total acid value of the lubricating oil. A combination of the fixed rotary speed of the engine and the load on the engine is changed for the test, the change of the total acid value in the lubricating oil in each combination is measured and stored in a control section (computer), and then the control section is mounted on an actual machine. Subsequently, the engine rotary speed and the load on the engine for the actual machine are measured at given time intervals and then a load frequency under operation is calculated and stored. On the basis of the load frequency measured at given time intervals and the change of the total acid value in the lubricating oil on the test bench, a change of the total acid value of the actual machine in a given time (for example, 10 hours) is calculated. The control section determines the total acid value accumulated in the lubricating oil for a given time (for example, 10 hours) of the actual machine. Specifically, the control section calculates an accumulated total acid value accumulated in the lubricating oil by cumulating the total acid values up to the last calculation, calculates a degree of deterioration of the lubricating oil by comparing the accumulated total acid value with a threshold value, and displays a predicted time when the accumulated total acid value will reach the threshold value. In addition, an alarm is produced if necessary.

As set forth in the above, by using data of the total acid value from the test bench, the total acid value of the lubricating oil can be predicted and a precision of predicting the total acid value is improved. Thus, the problem of bearing seizures is resolved. In addition, by using data of the total acid value from the test bench, the precision of predicting the total acid value is improved so that it can be accurately predicted even if the operating condition of the actual machine has changed. The lubricating oil can thereby be replaced with new oil at an appropriate time so as to achieve reliable maintenance of the engine.

According to a second aspect, which depends on the first aspect, the apparatus comprises a total acid value storing means to respectively divide the engine rotary speed and the engine load into predetermined divisions to premeasure an increase of the total acid value per unit time in the lubricating oil on the test bench corresponding to each predetermined division and for storing the values as a map; an operating load frequency calculating means for calculating and storing a engine load frequency for a set period in the test bench map after receiving signals from the engine rotary speed sensor and the engine load sensor; a total acid value calculating means for calculating an increase of a total acid value for a period set based on both the map stored in the total acid value storing means and the map of the load frequency stored in the operating load frequency calculating means; and a total acid value displaying means for displaying the time when a sum of the increases of the total acid value will exceed a threshold value as a result of integrating the determined increases of the total acid value or that the sum exceeds the threshold value after an elapse of a predetermined time.

According to the above configuration, the engine rotary speed and the load on the engine are respectively divided into predetermined divisions, and an engine rotary speed and an engine load corresponding to each predetermined division are fixed during continuous running for 20 hours on a test bench, for example, to measure a change of the total acid value in the lubricating oil and to store the values in a map. Next, the engine rotary speed and the load on the engine are measured and calculated at given time intervals in the actual machine and load frequencies for respective predetermined divisions corresponding to the map on the test bench are determined to be stored. Then, a change of the total acid value for a given time (for example, 10 hours) of the actual machine is calculated based on the load frequency in the map measured at given time intervals and based on the change of the total acid value in the lubricating oil in the map from the test bench. The control section determines the total acid value accumulated in the lubricating oil for a given time (for example, 10 hours) of the actual machine by a calculation and an accumulated total acid value content of the lubricating oil by cumulating the total acid values up to the last calculation, calculates a degree of deterioration of the lubricating oil by comparing the accumulated total acid value with a threshold value, and displays the time when the accumulated total acid value will reach the threshold value.

Therefore the same advantage as for the first aspect of the invention is achieved, and data can be collected more easily due to a simplified and more rapid calculation in the control section by putting data from a test bench and data from the actual machine together into respective predetermined divisions.

According to a third aspect, which depends from the first and second aspects, the apparatus comprises an oil temperature sensor for detecting an oil temperature of an engine; a total acid value storing means for respectively dividing the engine rotary speed and the load on the engine into fixed divisions to measure an increase of the lubricating oil total acid value per unit time on a test bench corresponding to each predetermined division and for storing the values in a map, where the lubricating oil is kept at a predetermined temperature; an oil temperature storing means, responsive to signals from the oil temperature sensor, for measuring (upon measuring a load frequency of the engine for a set period) and storing an oil temperature in a map corresponding to the engine rotary speed and the engine load and corresponding to the increase of the total acid value map from the test bench; a total acid value correcting means for correcting an increase of the total acid value per unit time in the lubricating oil on a test bench after receiving the oil temperature from the oil temperature storing means; a total acid value calculating means for calculating an increase of the total acid value for a period set based on the increase of the total acid value per unit time in the lubricating oil corrected by the total acid value correcting means and based on the load frequency determined by the operating load frequency calculating means; and a total acid value displaying means for displaying the time when a sum of the increases of the total acid value will exceed a threshold value, the sum being a result of integrating the determined increases of the total acid value, or that the sum will exceed the threshold value after an elapse of a predetermined time.

According to the above configuration, on a test bench, the engine rotary speed, the engine load, and the engine lubricating oil temperature are fixed during continuous running for a given time, for example, to measure a change of the total acid value in the lubricating oil. A combination of the fixed rotary speed of the engine and the load on the engine is changed for the test, the change of the total acid value in the lubricating oil in each combination is measured and stored in a control section. The control section is then mounted on an actual machine. Subsequently, the engine rotary speed and the engine load of the actual machine and the oil temperature of the lubricating oil are measured at given time intervals. A load frequency under operation is calculated and stored. The change of the total acid value in the lubricating oil on the test bench is corrected and stored so as to meet the oil temperature of the actual machine. A change of the total acid value within a given time (for example, 10 hours) of the actual machine is calculated based on both the corrected change of the total acid value in the lubricating oil and the load frequency measured at given time intervals. The control section determines the corrected total acid value accumulated in the lubricating oil within a given time (for example, 10 hours) of the actual machine by a calculation and an accumulated total acid value accumulated in the lubricating oil by cumulating the corrected total acid values up to the last calculation, calculates a degree of deterioration of the lubricating oil by comparing the accumulated total acid value with a threshold value, and displays the time when the predicted accumulated total acid value will reach the threshold value. In addition, an alarm is produced if necessary.

Therefore, the same advantage as for the first aspect of the invention is achieved. By correcting the total acid value from the test bench so as to meet the oil temperature of the actual machine, the prediction precision of the total acid value is improved so that the value can be accurately predicted even if the operating condition of the actual machine has changed. Thus, the lubricating oil can be replaced with new oil so as to achieve reliable maintenance of the engine.

According to a fourth aspect, an engine lubricating oil replacement time predicting apparatus for predicting the replacement time of a lubricating oil comprises an engine rotary speed sensor, an engine load sensor, a soot amount storing means, an operating load frequency calculating means, a soot amount calculating means, and a soot amount displaying means. On a bench test, the engine rotary speed sensor detects a rotary speed of the engine, and the engine load sensor detects an engine load. The soot amount storing means premeasures and stores an oil soot content amount increase per unit time in the corresponding to an engine rotary speed and an engine. The operating load frequency calculating means calculates and stores an engine load frequency for a set period upon receiving signals from the engine rotary speed sensor and the engine load sensor. The soot amount calculating means calculates an increase of a oil soot content amount for a period set based on both the information stored in the soot amount storing means and the engine load frequency information stored in the operating load frequency calculating means. The soot amount displaying means displays a time when a sum of the oil soot content increases exceeds a threshold value, where the sum results from integrating the determined increases of the soot amount, or that the sum exceeds the threshold value after an elapse of a predetermined time.

According to this configuration, on a test bench, the engine rotary speed and the engine load are fixed during continuous running for a given time to measure a change of the lubricating oil soot content. A combination of the fixed rotary speed of the engine and the load on the engine is changed for the test, the change of the soot amount in the lubricating oil in each combination is measured and stored in a control section. The control section is then mounted within an actual machine. Subsequently, the engine rotary speed and the load on the engine of the actual machine are measured at given time intervals, and then a load frequency under operation is calculated and stored. On the basis of the load frequency measured at given time intervals and the change of the soot amount in the lubricating oil on the test bench, a change in the actual machine oil soot content amount in a given time (for example, 10 hours) is calculated. The control section determines the soot amount accumulated in the lubricating oil within a given time (for example, 10 hours) of the actual machine by a calculation, an accumulated soot amount accumulated in the lubricating oil by cumulating the soot amounts up to the last calculation, calculates a degree of deterioration of the lubricating oil by comparing the accumulated soot amount with a threshold value, and displays the time when the accumulated soot amount accumulated reaches a threshold value. In addition, an alarm is produced if necessary.

As set forth in the above, by using data of the change of the soot amount from the test bench, the soot amount of the lubricating oil can be predicted and a precision of predicting the soot amount is improved so that the problem of an engine damage caused by engine wear is resolved. In addition, by using test bench change of oil soot content amount data corresponding to the engine rotary speed and the engine load on the engine, the precision of predicting the change of the soot amount is improved so that the accumulated soot content can be accurately predicted even if the operating condition of the actual machine has changed. Thus, the lubricating oil can be replaced with new oil at an appropriate replacement time so as to achieve reliable maintenance of the engine.

According to a fifth aspect, which depends on the fourth aspect, the apparatus comprises a soot amount storing means for respectively dividing an engine rotary speed and an engine load into predetermined divisions to premeasure an increase of a soot amount per unit time in a lubricating oil on a test bench corresponding to each predetermined division and for storing the values in a map; an operating load frequency calculating means for calculating and storing an engine load frequency for a set period in the map responsive to signals from the engine rotary speed sensor and the engine load sensor; a soot amount calculating means for calculating an increase of a soot amount for a period set on the basis of both the map stored in the soot amount storing means and the map stored in the operating load frequency calculating means; and a soot amount displaying means for displaying the time when a sum of the increases of the oil soot content amount exceeds a threshold value, the sum resulting from integrating the determined increases of the soot amount, or that the sum exceeds the threshold value after an elapse of a predetermined time.

According to the above configuration, on a test bench, the engine rotary speed and the engine load are respectively divided into predetermined divisions, and the engine rotary speed and the load on the engine corresponding to each predetermined division are fixed during continuous running for a given time, for example, to measure a change of the soot amount in the lubricating oil. The values are stored in a map. Subsequently, the engine rotary speeds and the engine loads are measured and calculated at given time intervals in the actual machine. Load frequencies for respective predetermined divisions, corresponding to the test bench map, are determined and stored. Then, a change of soot amount for a given time (for example, 10 hours) of the actual machine is calculated based on both the engine load frequency in the map measured at given time intervals and the test bench change of the soot amount in the lubricating oil. The control section determines the soot amount accumulated in the lubricating oil within a given time (for example, 10 hours) of the actual machine by a calculation and an accumulated soot amount accumulated in the lubricating oil by cumulating the soot amounts up to the last calculation, calculates a degree of deterioration of the lubricating oil by comparing the accumulated soot amount with a threshold value, and displays the time when the accumulated soot amount will reach the threshold value.

The same advantage as for the fourth aspect of the invention is achieved. Data can be collected more easily due to a simplified and more rapid calculation in the control section by combining data from the test bench and data from the actual machine together into respective predetermined divisions.

According to a sixth aspect, an apparatus comprises an engine rotary speed sensor, an engine load sensor, a soot amount storing means, a rapid acceleration soot amount storing means, a load frequency calculating means, a rapid acceleration frequency storing means, a soot amount calculating means, and a soot amount displaying means. The engine rotary speed sensor detects an engine rotary speed, and the engine load sensor detects an engine load. The soot amount storing means premeasures and stores an increase of soot per unit time in the lubricating oil corresponding to an engine rotary speed and a load on the engine on a test bench.

The rapid acceleration soot amount storing means determines and stores a soot amount for each rapid acceleration in which the engine is driven on a test bench. The load frequency calculating means calculates and stores an engine load frequency for a set period in response to receiving signals from the engine rotary speed sensor and the engine load sensor. The rapid acceleration frequency storing means calculates and stores a degree and a frequency of the rapid acceleration applied to the engine in response to signals from the engine rotary speed sensor alone. The soot amount calculating means adds a calculated oil soot content increase for a set period (which is based on both the data stored in the soot amount storing means and the data stored in the operating load frequency calculating means) and a calculated increase of a soot amount for a set period (calculated from an oil soot content amount increase for rapid accelerations based on the premeasured test bench data stored in the rapid acceleration soot amount storing means and the degree and frequency of the rapid acceleration data stored in the rapid acceleration frequency storing means). A soot amount displaying means for displaying a time when a sum of the increases of the soot amounts exceeds a threshold value, where the determined increases are integrated, or that the sum exceeds the threshold value after an elapse of a predetermined time.

According to this configuration, on a test bench, the engine rotary speed and the engine load are respectively fixed during continuous operation for a fixed time so as to measure and store a change of the oil soot content amount. The engine is subject to rapid accelerations on a test bench so as to measure and store a soot amount in the lubricating oil for the rapid acceleration times. A combination of the less variable fixed engine rotary speeds and engine loads is changed for a test, and the change of the soot amount in the lubricating oil in each combination is measured. In addition, a combination of the more variable engine rotary speed and engine load is changed for a test to measure a change of the soot amount in the lubricating oil at rapid acceleration. Once the oil soot content data are stored in a control section, the control section is mounted within the actual machine. Subsequently, the less variable engine rotary speed and load on the engine of the actual machine are measured at given time intervals, and the less variable load frequency (under operation) and the load frequency at the rapid acceleration are calculated and stored. On the basis of a change of the lubricating oil soot content amount on the test bench (i.e., determined from the load frequency measured at given time intervals and the load frequency at the rapid acceleration), a change of the soot amount of the actual machine in a given time (for example, 10 hours) is calculated. The control section calculates the soot amount accumulated in the lubricating oil within a given time (for example, 10 hours) of the actual machine and an accumulated soot amount accumulated in the lubricating oil by cumulating the soot amounts up to the last calculation, calculates a degree of deterioration of the lubricating oil by comparing the accumulated soot amount with a threshold value, and displays the time when the accumulated soot will reach the threshold value. In addition, an alarm is produced if necessary.

As set forth in the above, by adding the amount of soot generated at the variable engine rotary speed and load greater than the amount of soot generated at the less variable engine rotary speed and load, a more accurate amount of soot in the lubricating oil can be predicted and the precision of predicting the soot amount is improved. Thus, the problems for avoiding increased wear or damage on engine due to lubricating oil are resolved. In addition, by using data of the change of the soot amount on the test bench corresponding to the engine rotary speed and the engine load, the precision of predicting the change of the soot amount is improved so that it can be accurately predicted even if the operating condition of the actual machine change; therefore, the lubricating oil can be replaced with new oil at an appropriate time so as to achieve reliable maintenance of the engine.

According to a seventh aspect, an apparatus comprises an engine rotary speed sensor, an engine load sensor, a total acid value storing means, an operating load frequency calculating means, a total acid value calculating means, a soot amount storing means, a total soot amount calculating means, and a total acid value and soot amount displaying means. The engine rotary speed sensor detects an engine rotary speed, and the engine load sensor detects an engine load. For establishing initial values from a test bench, the total acid value storing means premeasures and stores an increase of a total lubricating oil acid value per unit time corresponding to an engine rotary speed and to an engine load. The operating load frequency calculating means calculates and stores an engine load frequency for a set period in response to engine rotary speed sensor signals and engine load sensor signals. The total acid value calculating means calculates an increase of a total acid value for a set period based on both data stored in the total acid value storing means and data stored in the operating load frequency calculating means. The soot amount storing means premeasures and stores an increase of lubricating oil soot content amount per unit time in corresponding to the engine rotary speed and the load on the engine on a test bench. The total soot amount calculating means calculates an oil soot content amount increase for a set period based on both the data stored in the soot amount storing means and the data stored in the operating load frequency calculating means. Finally, the total acid value and soot amount displaying means displays a time when a sum of the respective increases of either the total acid value or the oil soot content amount exceeds a threshold value, determined through integration of the determined increase values, or that exceeds the threshold value after an elapse of a predetermined time.

As set forth in the above, with displaying the time when a sum of the increases of either the total acid value or the soot amount exceeds the threshold value or that it exceeds the threshold value after an elapse of a predetermined time, deterioration of the lubricating oil can be predicted more accurately.

According to a first aspect of a method of predicting a replacement time for an engine lubricating oil of the present invention, the engine lubricating oil replacement time predicting method comprises the steps of premeasuring and storing an increase of a total lubricating oil acid value per unit time corresponding to a test bench engine rotary speed and a test bench engine load; calculating and storing a frequency of an engine load for a set period based on the engine rotary speed and the engine load; calculating an increase of a total acid value for a set period based on both premeasured increases of the total lubricating oil acid value per unit time from the test bench and the engine load frequency; and displaying a time when a sum of the increases of the total lubricating oil acid value exceeds a threshold value or exceeds the threshold value after an elapse of a predetermined time.

According to the method set forth in the above, the same advantage as for the first aspect of the predicting apparatus of the invention is achieved.

According to a second aspect of a method of predicting a replacement time for an engine lubricating oil of the present invention, the engine lubricating oil replacement time predicting method comprises the steps of dividing the engine rotary speed and the engine load respectively into predetermined divisions to premeasure an increase of the total acid value in the lubricating oil per unit time on a test bench, where the premeasurements correspond to each predetermined division; storing the values in a map; calculating an engine load frequency for a set period based on both the engine rotary speed and the engine load and storing the data in the same map; calculating an increase of a total acid value for a set period based on both the map of the premeasured increase of the total acid value per unit time on the test bench and the map of the load frequency; and displaying the time when a sum of the increases of the total acid value exceeds a threshold value as a result of integrating the determined increase values or that it exceeds the threshold value after an elapse of a predetermined time.

According to the method set forth in the above, the same advantage as for the second aspect of the predicting apparatus of the invention is achieved.

According to a third aspect of a method of predicting a replacement time for an engine lubricating oil of the present invention, the engine lubricating oil replacement time predicting method comprises the steps premeasuring and storing an increase of lubricating oil soot content per unit time to an engine rotary speed and load on the engine from test bench operation; calculating an engine frequency load for a set period based on the engine rotary speed and the engine load; calculating an increase of a soot amount for a set period based on both the premeasured increase of the soot amount in the lubricating oil per unit time from the test bench and the engine load frequency; and displaying the time when a sum of the increases of the soot amount exceeds a threshold value, the time being determined by integrating the determined increases of the soot amount, or that the sum of the increases of the soot amount will exceed the threshold value after an elapse of a predetermined time.

According to the method set forth in the above, the same advantage as for the fourth aspect of the predicting apparatus of the invention is achieved.

According to a fourth aspect of a method of predicting a replacement time for an engine lubricating oil of the present invention, the engine lubricating oil replacement time predicting method comprises the steps of determining and storing an increase of a lubricating oil soot content amount per unit time, corresponding to a test bench engine rotary speed and a test bench load at less variable engine revolutions, and an increase of a lubricating oil soot content amount for a number of rapid acceleration times after subjecting the engine to rapid accelerations on a test bench; calculating and storing an engine load frequency for a set period and an engine load frequency for rapid accelerations based on engine rotary speed and engine load; calculating an increase of a soot amount at the less variable engine revolutions based on both the premeasured test bench increase of the soot amount per unit time and the load frequency; calculating an increase of a soot amount for rapid acceleration based on both the premeasured test bench increase of the soot amount per unit time for rapid acceleration and the load frequency for the rapid acceleration; calculating an increase of a soot amount for a set period by adding these calculated increases; and displaying a time when a sum of the increases of the soot amounts exceeds a threshold value, as determined by integrating the determined increases of the soot amounts, or that it exceeds the threshold value after an elapse of a predetermined time.

According to the method set forth in the above, the same advantage as for the sixth aspect of the predicting apparatus of the invention is achieved.

According to a fifth aspect of a method of predicting a replacement time for an engine lubricating oil of the present invention, the engine lubricating oil replacement time predicting method comprises the steps of premeasuring and storing an increase of a total lubricating oil acid value per unit time corresponding to a test bench engine rotary speed and a test bench engine load; calculating and storing an engine load frequency for a set period based on an engine rotary speed and an engine load; calculating an increase of a total acid value for a set period based on both the premeasured test bench increase of the total acid value per unit time and the engine load frequency; premeasuring and storing an increase of a lubricating oil soot content amount per unit time corresponding to the test bench engine rotary speed and the test bench engine load; calculating and storing an engine load frequency for a set period based on the engine rotary speed and the engine load; calculating an increase of a soot amount for a period set based on both the test bench premeasured increase of the soot amount per unit time and the load frequency; and displaying the time when a sum of the increases of either the total acid value or the soot amount exceeds a threshold value or that the sum exceeds the threshold value after an elapse of a predetermined time.

According to the method set forth in the above, the same advantage as for the seventh aspect of the predicting apparatus of the invention is achieved.

DETAILED DESCRIPTION OF THE PREFERRED EMBODIMENTS

A detailed description will be given below for embodiments of an apparatus and a method for predicting a time for replacing of an engine lubricating oil according to the present invention by reference to the accompanying drawings.

Figure 1:
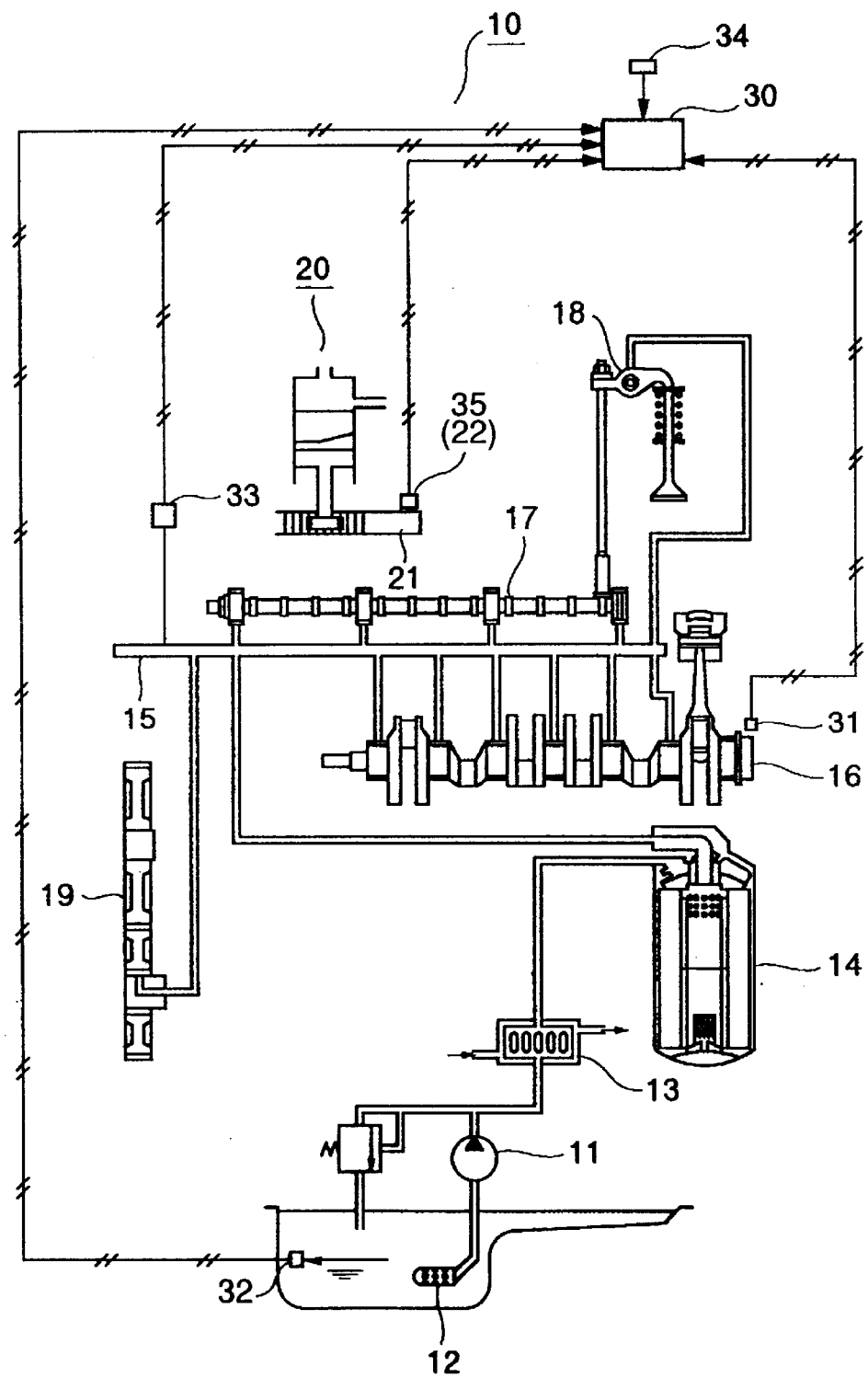
FIG. 1 is a general configuration diagram of a lubricating apparatus for a diesel engine according to the present invention.

Referring to FIG. 1, there is shown a general configuration diagram of a lubricating apparatus 10 for a diesel engine (hereinafter, an "engine") according to the present invention. A lubricating oil is sucked from a hydraulic pump 11 through an oil strainer 12 and then transmitted to an oil cooler 13 so as to be cooled. The cooled lubricating oil is transmitted to an oil filer 14 so as to be filtered, and then fed to a main gallery 15 to be distributed to lubricate a crank shaft 16, a cam shaft 17, a rocker arm 18, a timing gear 19 and other sections. In addition, an engine is provided with a fuel injection pump 20, and a rack 21 thereof is provided with a fuel injection amount measuring apparatus 22 (hereinafter, a rack position sensor 22) for measuring a fuel injection amount of the fuel injection pump 20. The rack position sensor 22 is connected to a control section 30 so as to transmit to the control section 30 an injection amount signal indicative of an amount of an injection from the fuel injection pump 20 to the engine cylinder. A load (load torque) on the engine can be detected with this signal. Additionally by using a rate of change per unit time of the signal from the rack position sensor 22, a sharply applied load on the engine can be detected. At this point, while the injection amount from the fuel injection pump 20 is detected by the rack position sensor 22, for an electronic control fuel injector it is possible to use an electric signal which corresponds to the injection amount.

The control section 30 is connected to an engine rotary speed sensor 31 for detecting a rotary speed of the engine, an oil temperature sensor 32 for measuring a temperature of a lubricating oil of the main gallery 15 of the engine, a lubricating oil amount sensor 33 for detecting a lubricating oil amount within the engine, a reset switch 34 for returning an integrated time to zero when sensing a time when the total amount of lubricating oil is to be exchanged, and a load sensor 35. As the load sensor 35, it is possible to use the rack position sensor 22.

Next, an explanation will be made below for predicting a lubricating replacement time based on a determination of a total acid value in accordance with a first embodiment of an engine lubricating oil replacement time predicting apparatus 40.

Figure 9:
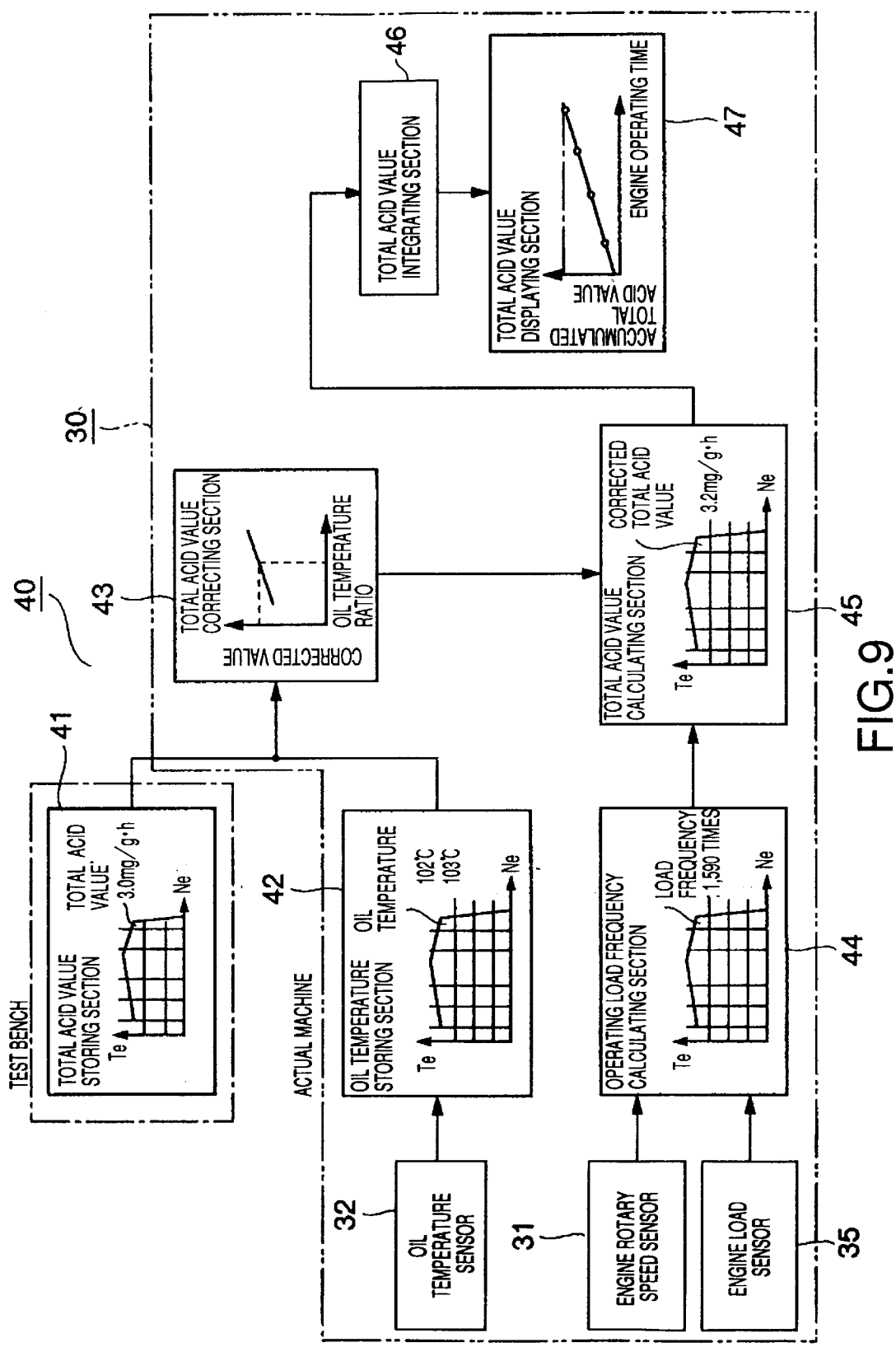
FIG. 9 is a block diagram of an engine lubricating oil replacement time predicting apparatus in accordance with a first embodiment of the present invention to determine a total acid value within a lubricating oil.

As shown in FIG. 9, the control section 30 comprises a total acid value storing section 41, an oil temperature storing section 42, a total acid value correcting section 43, an operating load frequency calculating section 44, a total acid value calculating section 45, a total acid value integrating section 46, and a total acid value displaying section 47.

Figure 2:
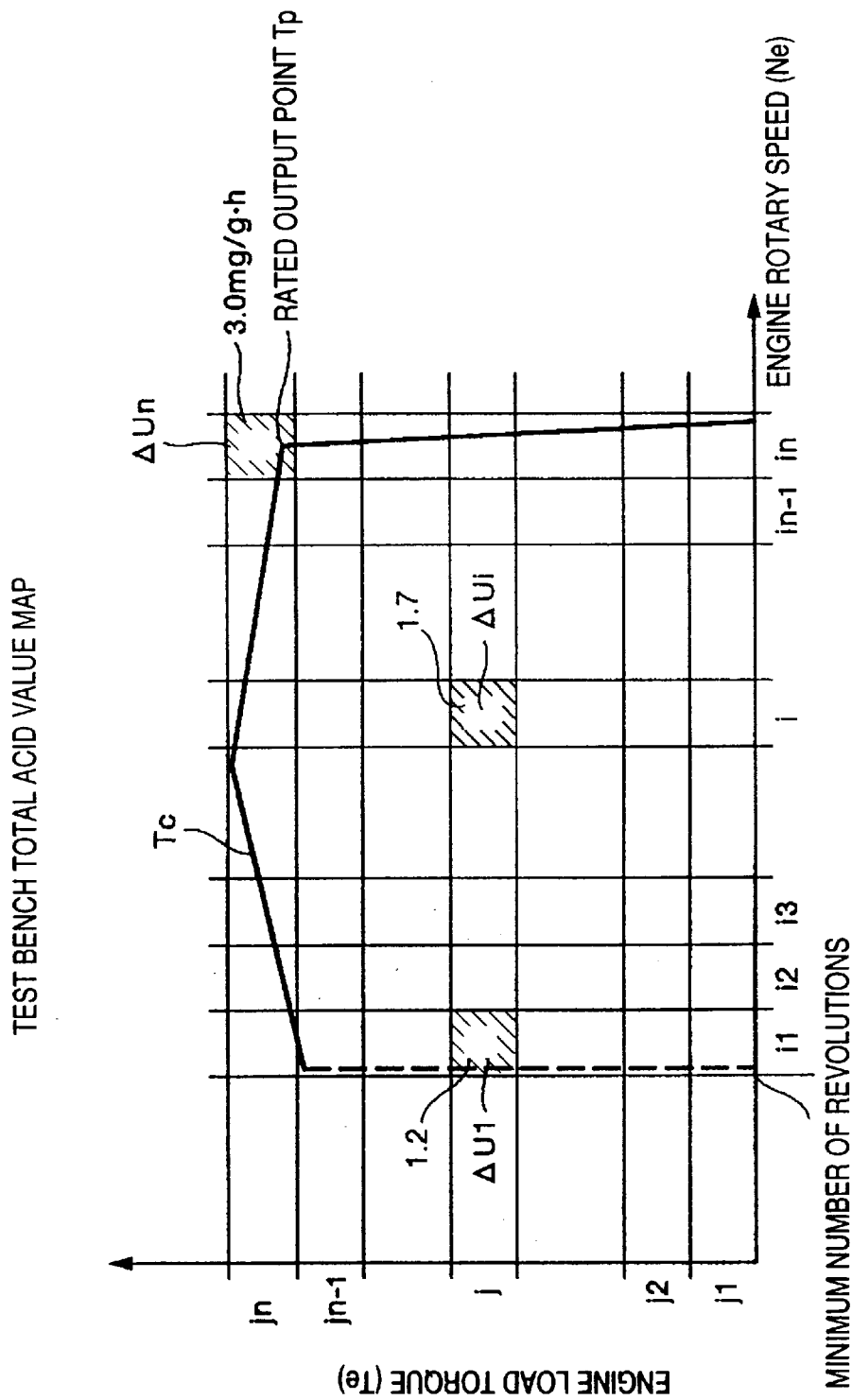
FIG. 2 is a map illustrating a total acid value of an engine lubricating oil on a test bench according to the present invention.

The acid value storing section 41 determines and stores values representing a total acid value of a lubricating oil per time for an engine driven on a test bench. At this point, as shown in FIG. 2, in the total acid value storing section 41, an engine rotary speed (Ne) is on the abscissa axis, an engine load torque (Te) is on the ordinate axis, and a torque curve $(T_c)$ of the engine is illustrated. The inside area of torque curve $(T_c)$ is divided. A total acid value is determined for each division $(\Delta U)$, and the divisions are stored to form a test bench total acid value map.

The engine rotary speed (Ne) on the abscissa axis is divided between i1 to in, and the engine load torque (Te) on the ordinate axis is divided between j1 to jn. A change rate of the total acid value $(\Delta T, mg/g \cdot h)$ is determined for each division $(\Delta U)$. For example, in a bench test, a value of 3.0 mg/g·h is determined and stored in a division $\Delta Un(in, jn)$ in which a rated output point (Tp) of the engine is entered; a value of 1.7 mg/g·h is determined and stored in a division $\Delta Ui(i, j)$; and a value of 1.2 mg/g·h is determined and stored in a division $\Delta A1(i1, j)$. In this manner, a change rate of the total acid value $(\Delta T)$ is determined for all the divisions on the test bench. Of note, the total acid value on the test bench is determined at a fixed coolant temperature (for example, water at 85° C.) and at a fixed lubricating oil temperature (for example, 100° C.) while driving the engine for a given time (for example, 20 hours) for each division.

Figure 3:
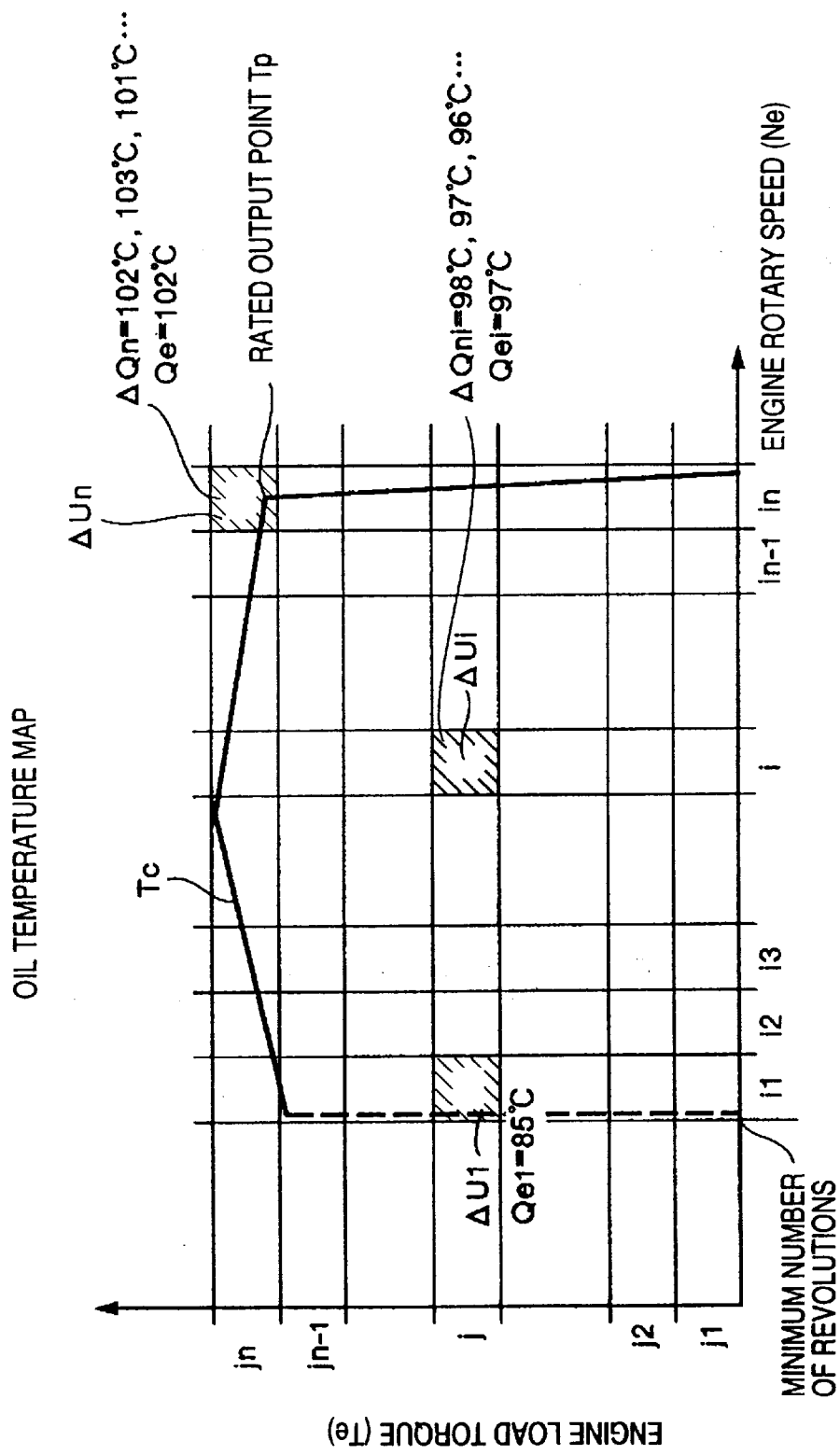
FIG. 3 is a map illustrating an example of an oil temperature of the engine lubricating oil during operation of an actual machine according to the present invention.

The oil temperature storing section 42 measures an oil temperature (Q) of the lubricating oil during the operation of the engine mounted on a construction machine, an automobile, or the like (hereinafter, an "actual machine") and stores the oil temperature (Q) for each measurement. At this point, as shown in FIG. 3, in the oil temperature storing section 42, an engine rotary speed (Ne) is on the abscissa axis, an engine load torque (Te) is on the ordinate axis, and a torque curve $(T_c)$ of the engine is illustrated. The inside area torque curve $(T_c)$ is divided. An oil temperature (Q) is determined for each map division $(\Delta U)$, and the divisions are stored as an oil temperature map.

The engine rotary speed (Ne) on the abscissa axis is divided between i1 to in, and the engine load torque (Te) on the ordinate axis is divided between j1 to jn. An oil temperature change rate $(\Delta Q)$ is determined for each division $(\Delta U)$. For example, an oil temperature $\Delta Qn$ (for example, 102° C., 103° C., or 101° C.) at each measurement is measured in a division $\Delta Un(in, jn)$ in which a rated output point (Tp) of the engine is entered, and an oil temperature $\Delta Qni$ (for example, 98° C., 97° C., or 96° C.) at each measurement is measured in a division $\Delta Ui(i, j)$. The measured values are stored at given time intervals. After adding up the values of the lubricating oil temperature $\Delta Qn$ for each division $(\Delta U)$ to determine a total lubricating oil temperature value (Qt), a lubricating oil temperature average value (Qe) (i.e., (Qe)=(Qt)/the number of measurements [n]) for a given time is then determined. For example, a lubricating oil temperature average value (Qe) of, for example, 85° C., 97° C., and 102° C. for Qe1, Qei, and Qe, respectively, is determined for an actual machine at 20-hr operating time intervals.

Figure 4:
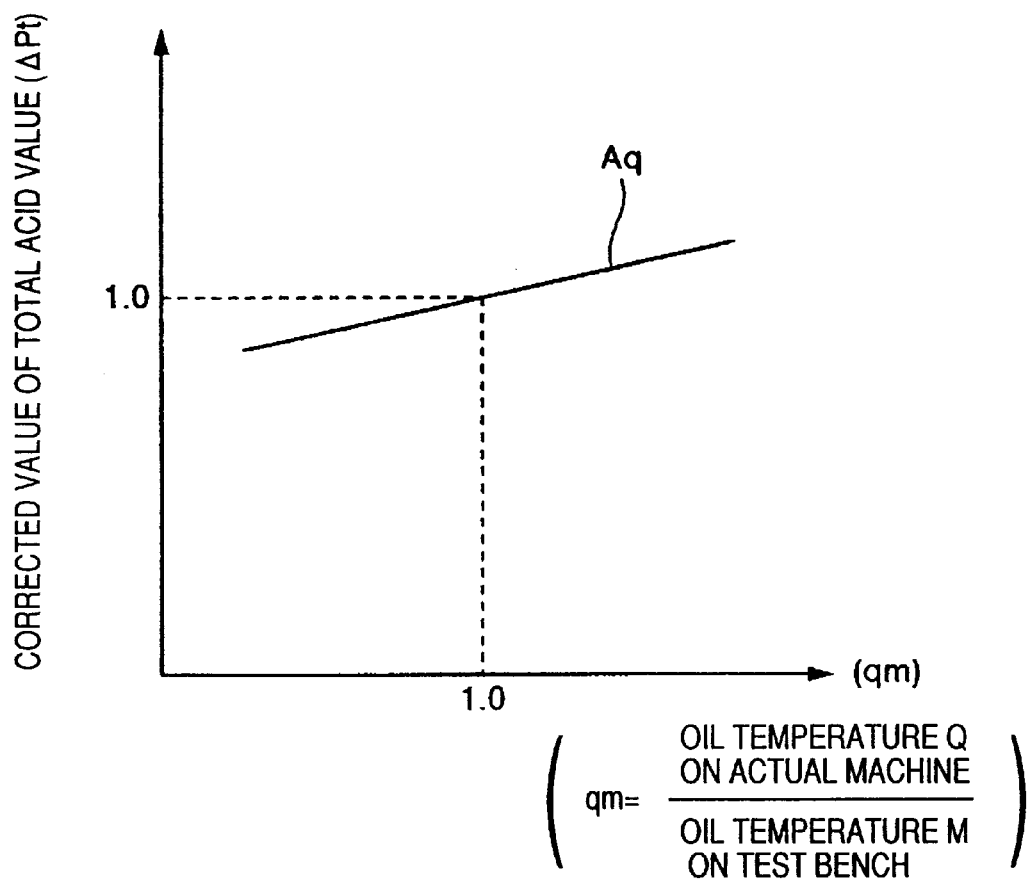
FIG. 4 is a diagram illustrating a relation between a ratio of an oil temperature in the actual machine to an oil temperature of the engine lubricating oil on the test bench and a corrected value of a total acid value.

The total acid value correcting section 43 determines a corrected value $(\Delta Pt)$ for the total acid value based on a relationship between a test bench lubricating oil temperature and an actual machine lubricating oil temperature. At this point, as shown in FIG. 4, a ratio (qm) of the oil temperature (Q) from the actual machine to the oil temperature (M) from the test bench ((qm)=(Q)/(M)) is on the abscissa axis, and the corrected value ($\Delta Pt$) of the total acid value is on the ordinate axis. The corrected value is represented by solid line Aq. For example, when the lubricating oil temperature (Q) is equal to 100° C. and the lubricating oil temperature M is equal to 100° C., the corrected value ($\Delta Pt$) of the total acid value is equal to 1.0. If the ratio exceeds 1.0, the corrected value ($\Delta Pt$) of the total acid value is greater than 1.0. This corrects an increase amount of the total acid value for each division from the test bench so as to obtain a corrected total acid value $\Delta Ut$) for each division from the actual machine.

Figure 5:
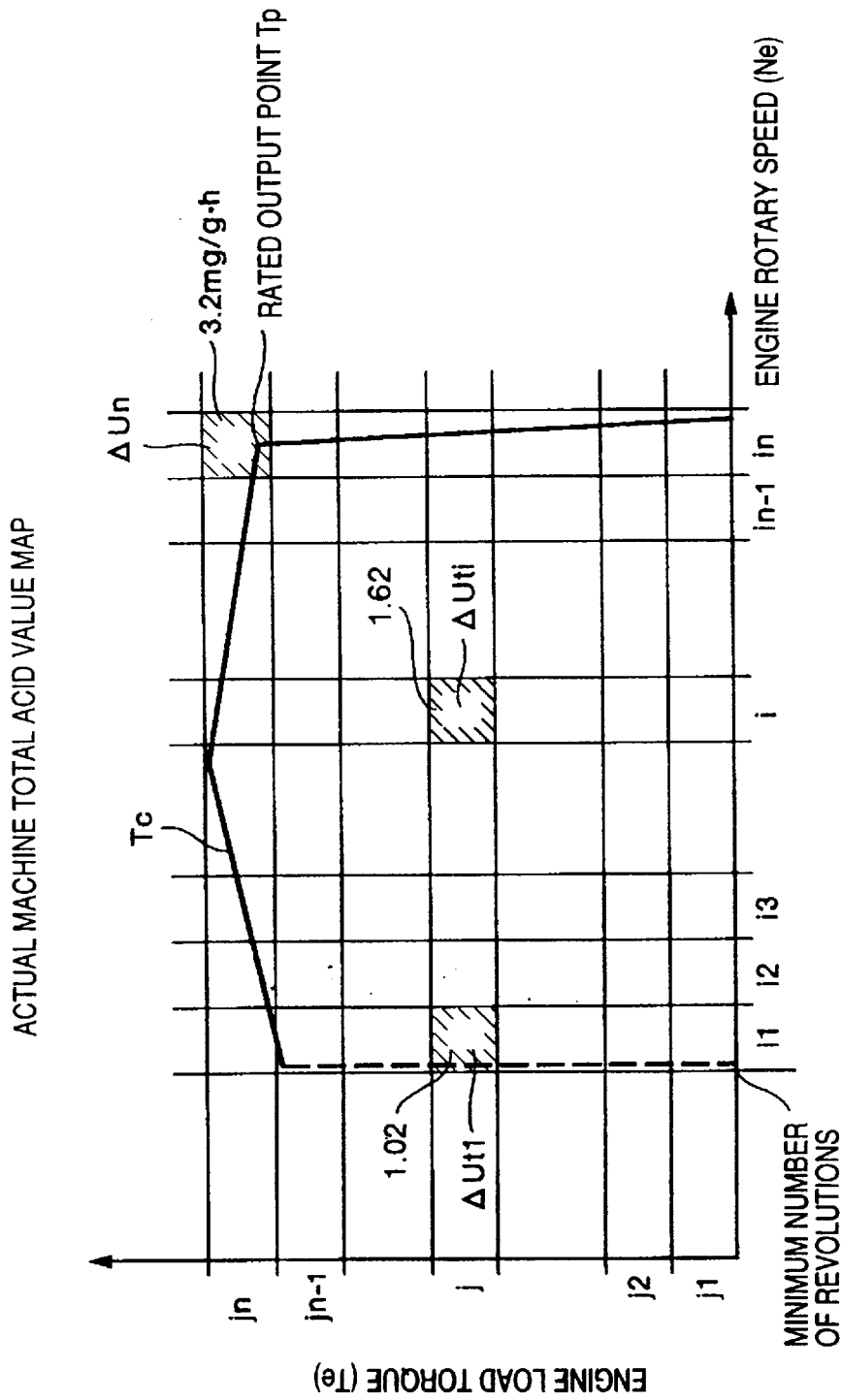
FIG. 5 is a map illustrating a total acid value of the engine lubricating oil during operation of the actual machine according to the present invention.

The total acid value correcting section 43 corrects the test bench total acid value map (FIG. 2) of the total acid value storing section 41 using the corrected value ($\Delta Pt$) of the total acid value. The total acid value correcting section 43 further obtains and stores an actual machine total acid value map as shown in FIG. 5. For example, in a division $\Delta Un(in, jn)$, in which a rated output point (Tp) of the engine is entered, a value of 3.0 mg/g·h is corrected to 3.2 mg/g·h.

Figure 6:
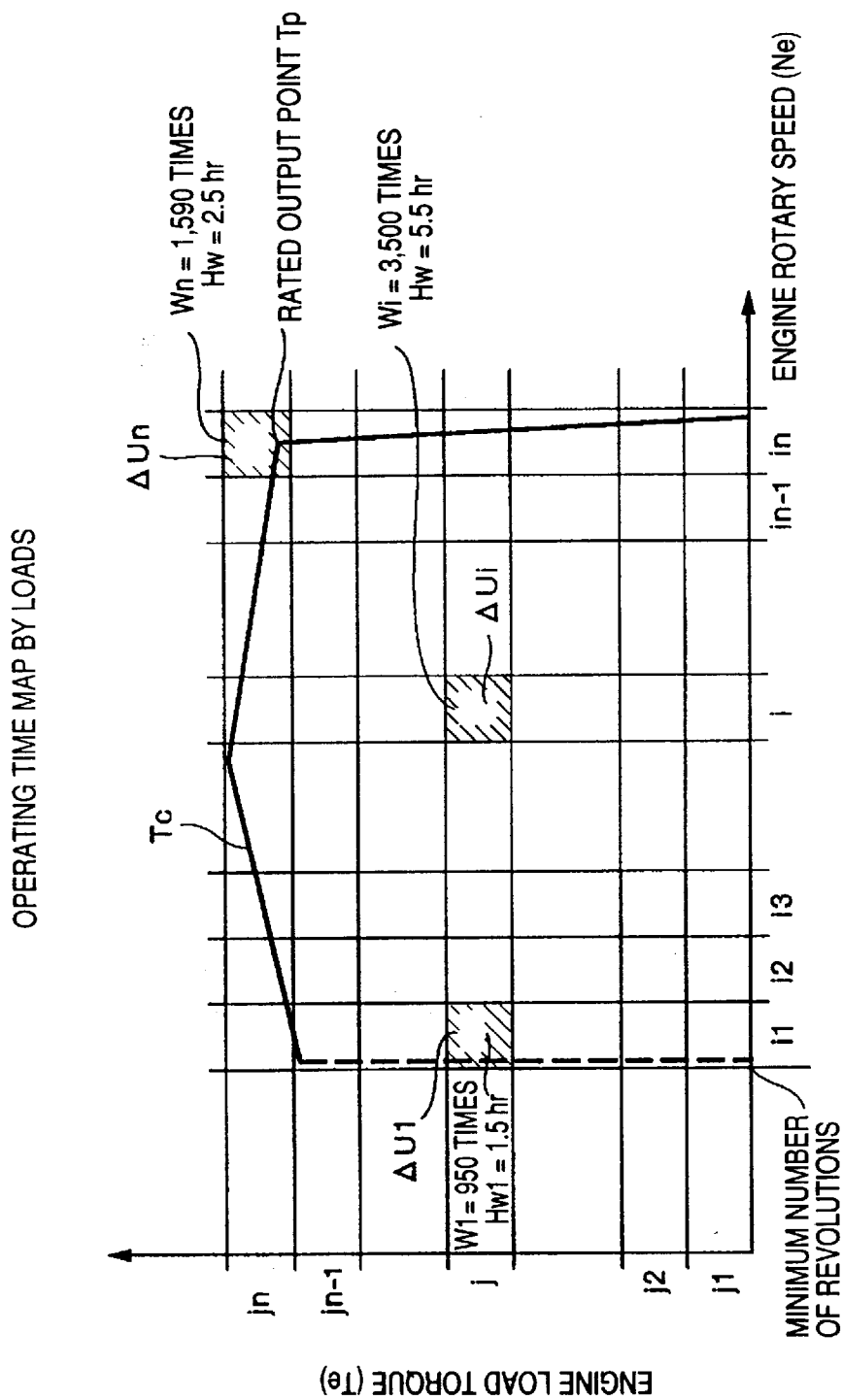
FIG. 6 is a map illustrating an operating time classified by loads on the engine during operation of the actual machine according to the present invention.

The operating load frequency calculating section 44 calculates and stores a load frequency on the diesel engine during the operation of the actual machine. At this point, as shown in FIG. 6, in the operating load frequency calculating section 44, an engine rotary speed (Ne) is on the abscissa axis, an engine load torque (Te) is on the ordinate axis, and a torque curve ($T_c$) of the engine is illustrated. The inside area of torque curve ($T_c$) is divided. A load frequency (W) is determined for each division ($\Delta U$), and the load frequencies are stored as a map.

The engine rotary speed (Ne) on the abscissa axis is divided between i1 to in, and the engine load torque (Te) on the ordinate axis is divided between j1 to jn. As provided above, a load frequency (W) is determined for each division ($\Delta U$). For example, the load frequency (W) is calculated in a division $\Delta Un(in, jn)$, in which a rated output point (Tp) of the engine is entered, and the value is stored at given time intervals. On the basis of the load frequency (W), it is possible to determine an operating time (Hw) ((Hw)=load frequency (W)×sampling interval (Tt)) for each division ($\Delta U$) which indicates how many hours will elapse at each division in the actual machine for a given time (for example, 20 hours). The operating load frequency calculating section 44 calculates the operating time (Hw) for each division of the load on the engine during the operation of the actual machine and stores it in an operating time map by loads. For example, in the division $\Delta Un$, in which the rated output point (Tp) of the engine is entered, a load frequency (W) of 1590 times and an operating time (Hw) of 2.5 hours are obtained.

Figure 7:
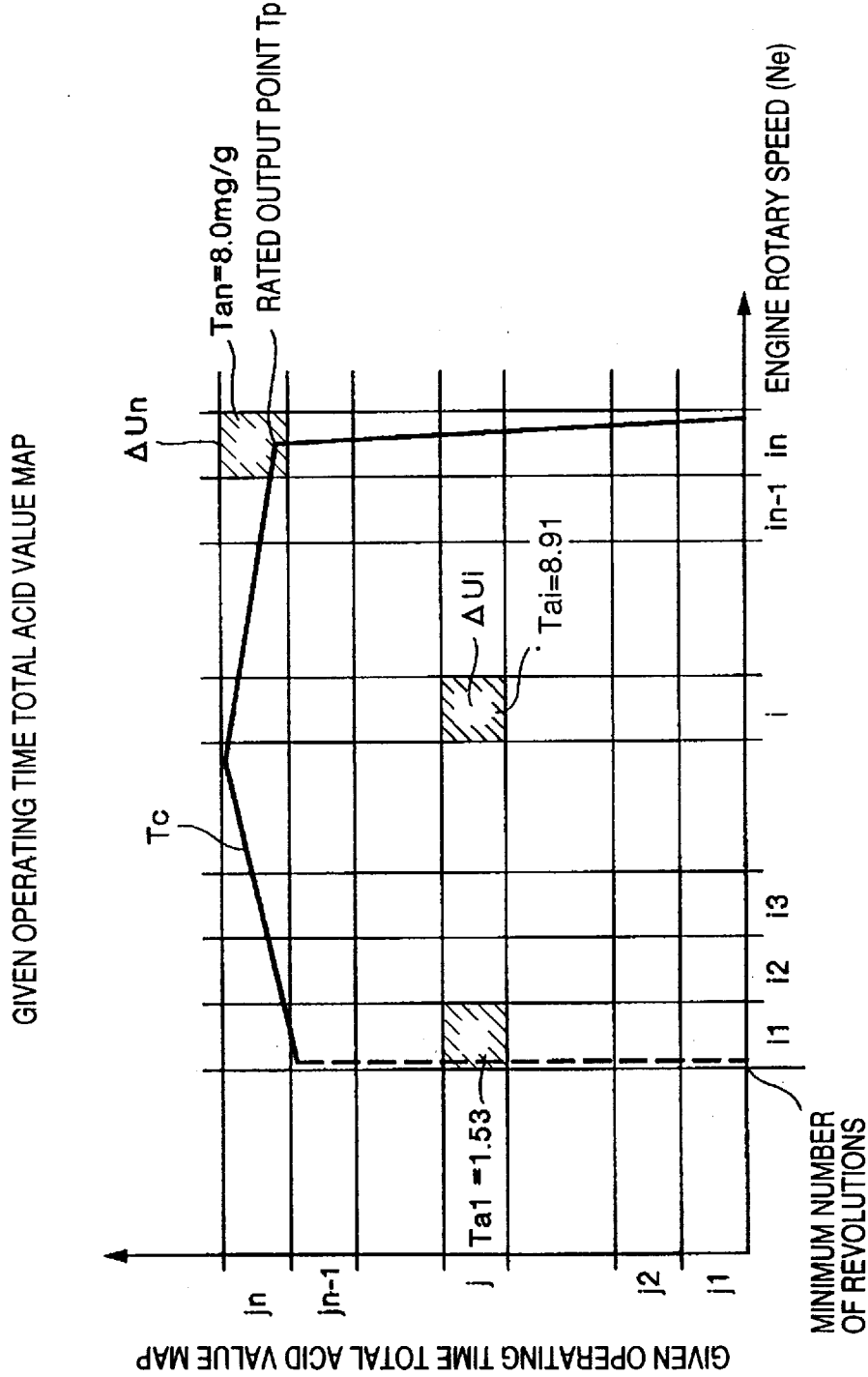
FIG. 7 is a map illustrating a total acid value of the engine lubricating oil for a given operating time during operation of the actual machine according to the present invention.

The total acid value calculating section 45 calculates a total acid value contained in the lubricating oil for a given time during the operation of the actual machine. At this point, the total acid value calculating section 45 determines a given operating time total acid value (Ta) for each division accumulated in the lubricating oil for a given operating time of the actual machine. The determination is based on both the actual machine total acid value map (FIG. 5) stored in the total acid value correcting section 43 and the operating time map by loads (FIG. 6) for a given operating time of the actual machine determined by the operating load frequency calculating section 44. The total acid value calculating section 45 further stores the values as a given operating time total acid value map, as shown in FIG. 7. For example, in the division $\Delta Un$, in which the rated output point (Tp) of the engine is entered, the total acid value (Ta) for a given time is determined to be 8.0 mg/g.

Figure 8:
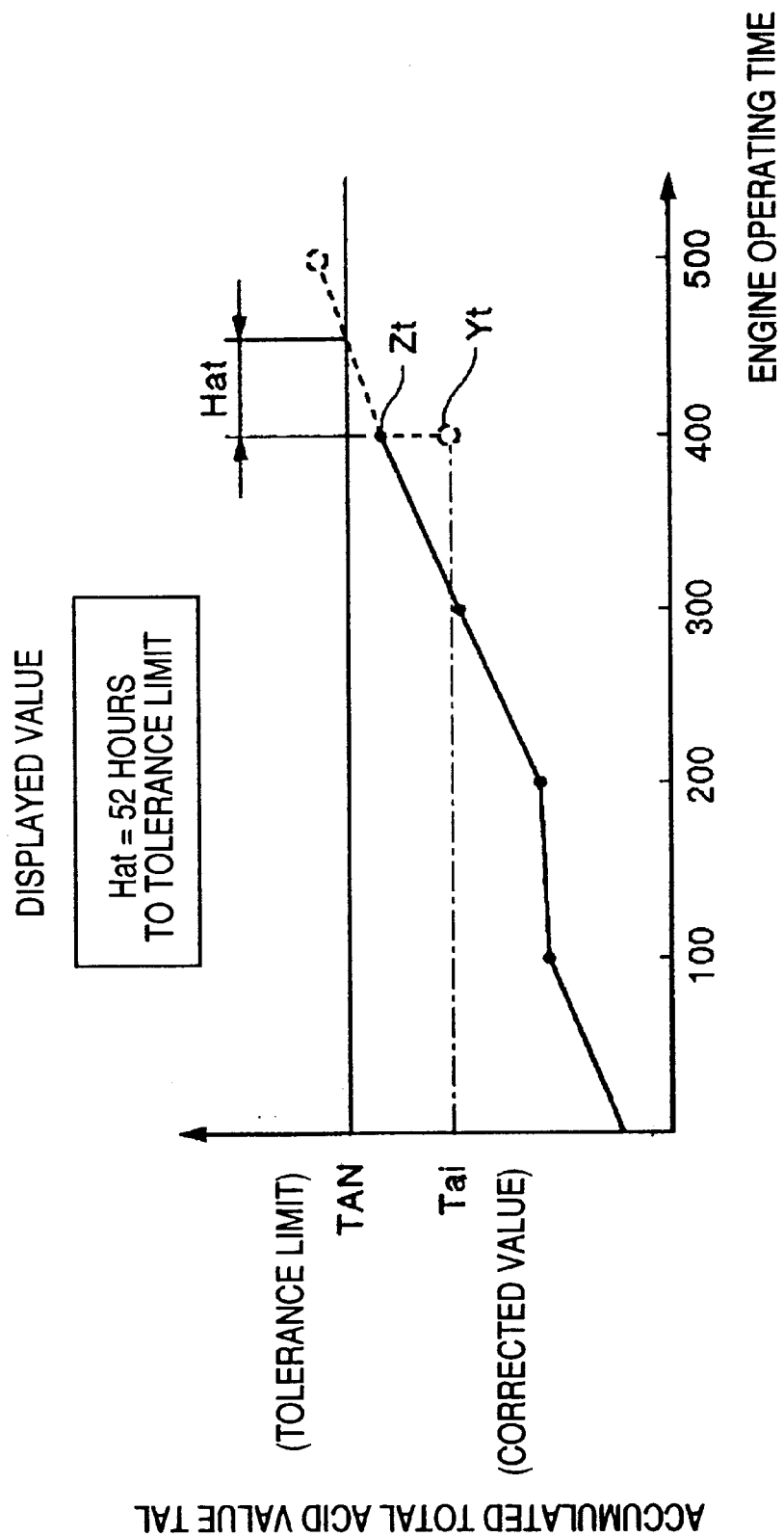
FIG. 8 is a diagram illustrating a total acid value displaying section for predicting the time when a total acid value reaches a tolerance limit after comparing the determined total acid value with the limit according to the present invention.

The total acid value integrating section 46 determines a given time total acid value (Ti) for a lubricating oil amount (La) of the engine under operation. The total acid value integrating section 46 further determines an accumulated total acid value (TAL) by accumulating the given time total acid values (Ti). At this point, the total acid value integrating section 46 determines the given time total acid value (Ti) by integrating the given time total acid values (Ta) accumulated in the lubricating oil for each division for a given operating time of the actual machine using the given operating time total acid value map (FIG. 7) obtained for each division and stored by the total acid calculating section 45. The total acid value integrating section 46 further determines the accumulated total acid value (TAL) by integrating the given time total acid values (Ti). Referring to FIG. 8, there is shown a chart with an operating time of the actual machine taken at time intervals of measurement time (H) as the abscissa axis and the accumulated total acid value (TAL) as the ordinate axis.

The total acid value displaying section 47 displays the accumulated total acid value (TAL) at given operating time intervals of the actual machine (for example, 100 hours) and displays a threshold value (TAN) which is a tolerance limit of the accumulated total acid value (TAL). At this point, as shown in FIG. 8, the total acid value displaying section 47 continuously displays the accumulated total acid values (TAL) determined by the total acid value integrating section 46 at given operating time intervals of the actual machine and displays how many hours (Hat) will elapse before the accumulated total acid value (TAL) reaches the tolerance limit of the threshold value (TAN) (for example, 52 hours). By this function, the working life of the lubricating oil can be predicted and a new lubricating oil can be prepared for replacement.

Figure 10:
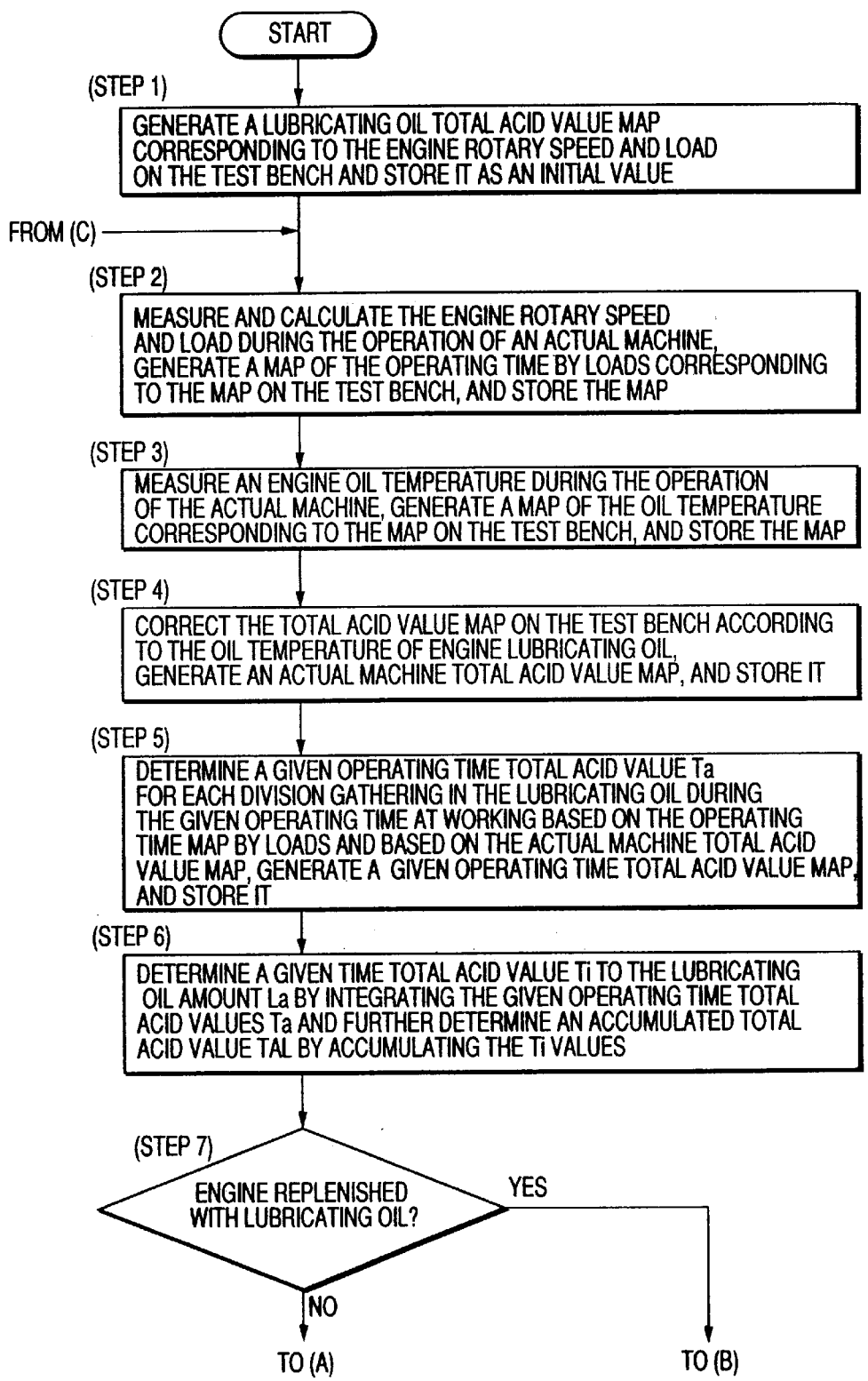
FIGS. 10 and 11 are flowcharts illustrating steps of determining the total acid value for the prediction according to the first embodiment of the engine lubricating oil replacement time predicting apparatus of FIG. 9.
Figure 11:
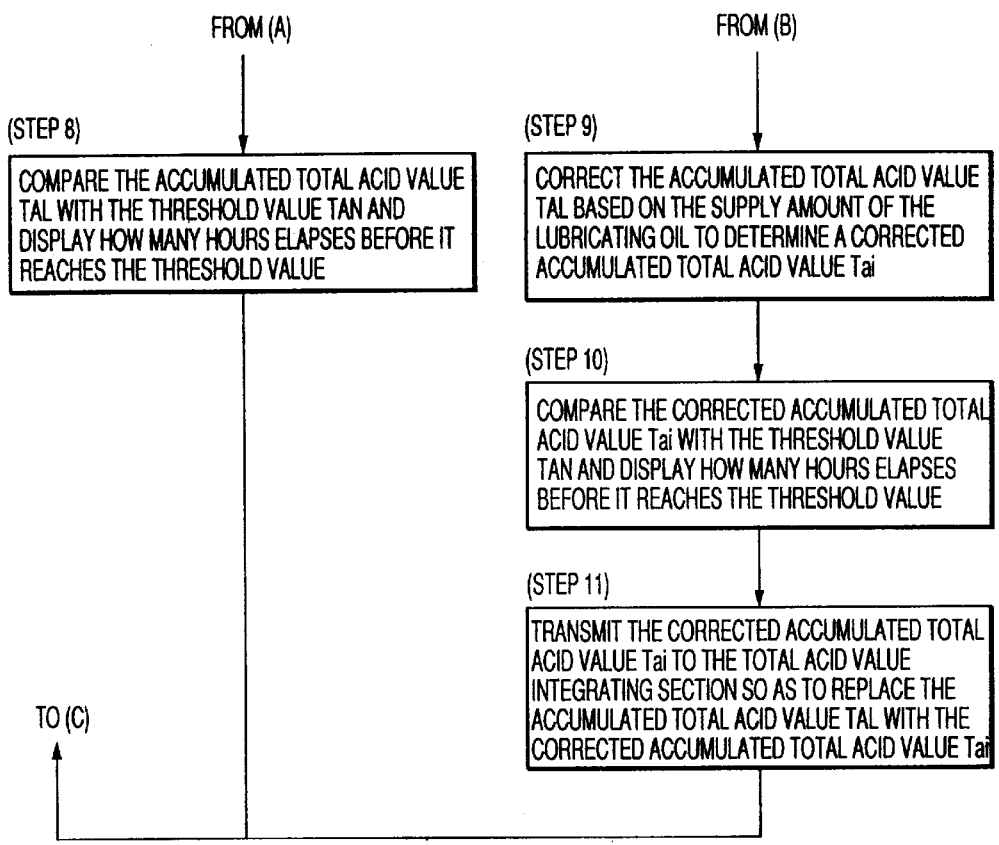

Next, referring to FIG. 9 and flowcharts of FIGS. 10 and 11, a method of predicting a total acid value according to the first embodiment of the engine lubricating oil replacement time predicting apparatus 40 is described below.

In step 1, the total acid value storing section 41 of the control section 30 stores as an initial value the test bench total acid value map (FIG. 2) determined for each engine on the test bench.

In step 2, a load frequency applied on the engine under operation is determined. The operating frequency calculating section 44 calculates a load (load torque) on the engine based on signals from the engine load sensor 35 (rack position sensor 22) and the engine rotary speed sensor 31 and determines the load frequency (W) for each division. Furthermore, on the basis of the load frequency (W), it determines the operating time (Hw) ((Hw)=load frequency (W)×sampling interval (Tt)) which indicates how many hours will elapse in each division of the actual machine for a given time and stores these values as the operating time map by loads (FIG. 6).

In step 3, an oil temperature of the lubricating oil of the diesel engine under operation is determined. The oil temperature storing section 42 receives a signal generated when the operating load frequency calculating section 44 determines a load on the engine, measures an oil temperature of the lubricating oil of the engine based on a signal from the oil temperature sensor 32, determines the oil temperature for each division (or an oil temperature average value (Qe)), and stores the temperatures as an oil temperature map as shown in FIG. 3.

In step 4, a total acid value of the lubricating oil under operation is determined according to an oil temperature of the lubricating oil of the diesel engine under operation. The total acid value correcting section 43 determines a corrected value ($\Delta$Pt) of a total acid value based on an oil temperature ratio (qm) (the test bench oil temperature (M) to the actual machine oil temperature (Q)) as shown in FIG. 4, corrects the test bench total acid value map stored in the total acid value storing section 41, and determines the actual machine total acid value map (FIG. 5) equivalent to divisions of the oil temperature frequency map stored in the oil temperature storing section 42. By this operation, the total acid value for each division on the test bench is corrected so as to determine the corrected total acid value which has been corrected for each division of the actual machine.

In step 5, a calculation is made to determine the total acid value (Ta) accumulated in the lubricating oil in each division during a given operating time of the actual machine. The total acid value calculating section 45 determines the given operating time total acid value (Ta) accumulated in the lubricating oil for each division for a given operating time of the actual machine based on both the actual machine total acid value map (FIG. 5) stored in the total acid value correcting section 43 and the operating time map by loads (FIG. 6) for a given time obtained from the operating load frequency calculating section 44. The total acid value calculating section 45 further stores the values as the given operating time total acid value map (FIG. 7).

In step 6, the given time total acid value (Ti) is determined for a lubricating oil amount (La) of the engine under operation, and the given time total acid values (Ti) are accumulated so as to obtain an accumulated total acid value (TAL). The total acid value integrating section 46 determines the given time total acid value (Ti) by integrating the values in respective divisions using the given operating time total acid value map (FIG. 7), obtained for respective divisions and stored by the total acid value calculating section 45, and determines the accumulated total acid value (TAL) by integrating the given time total acid values (Ti).

In step 7, it is judged whether or not the diesel engine is replenished with a lubricating oil. The control section 30 receives a signal from the lubricating oil amount sensor 33, judges whether or not the engine is replenished with a lubricating oil amount, and then detects a lubricating oil supply amount (Ln).

If the engine is not replenished with the lubricating oil amount, the control progresses to step 8.

In step 8, it is judged whether or not the ratio of the accumulated total acid value (TAL) to the lubricating oil amount (La) of the engine (before it is replenished with a lubricating oil amount (Ln)) is greater than the threshold value (TAN). As shown in FIG. 8, it is displayed how many hours will elapse before the accumulated total acid value (TAL) reaches the threshold value (TAN). It is useful to judge a degree of deterioration of the lubricating oil caused by the total acid value. After it is displayed, the control returns to step 2.

If the engine is replenished with the lubricating oil supply amount (Ln), the control progresses to step 9.

In step 9, the control section 30 determines a corrected accumulated total acid value (Tai) by correcting the accumulated total acid value (TAL) (point Zt) based on the lubricating oil amount (La) (i.e., pre-replenished amount of lubricating oil in the engine) and the total lubricating oil amount (LA) of the engine, where the total lubricating oil amount (LA) is equal to the lubricating oil amount (La) combined with the lubricating oil supply amount (Ln). The corrected accumulated total acid value (Tai) is indicated by a point Yt (point on the dotted line) as shown in FIG. 8.

In step 10, it is judged whether or not the ratio of the corrected accumulated total acid value (Tai) for the total lubricating oil amount (LA) of the engine is greater than the threshold value (TAN). As shown in FIG. 8, it is displayed how many hours will elapse before the corrected accumulated total acid value (Tai) reaches the threshold value (TAN). By this function, it becomes possible to judge a degree of deterioration of the lubricating oil caused by an acid value.

In step 11, the corrected accumulated total acid value (Tai) is transmitted to the total acid value integrating section 46 in which the conventional accumulated total acid value (TAL) is replaced with the corrected accumulated total acid value (Tai), and the "new" accumulated total acid value (TAL) is used as data of the lubricating oil under operation. After this replacement is displayed, the control returns to step 2.

In the measurement set forth above, the total acid value is determined by measuring the engine rotary speed, the engine load, and the oil temperature based on a trigger signal generated at given time intervals. The measurement intervals are put together in a given operating time of the actual machine (for example, 10 hours) to be integrated. The total acid values within the given operating time of the actual machine (for example, 10 hours) are further accumulated to be displayed at given time intervals (100 hours, for example). These measurements and displays are applied in the same manner to the amount of soot which is described later.

Next, an explanation will be made below for a prediction with determining the amount of soot according to a second embodiment of the engine lubricating oil replacement time predicting apparatus 50. The same components as for the first embodiment are designated by the same reference numerals, and therefore their explanation will be omitted here.

The control section 50 comprises a soot amount storing section 51, a rapid acceleration soot amount storing section 52, an operating load frequency calculating section 44, a rapid acceleration frequency storing section 53, a soot amount calculating section 54, a soot amount integrating section 55, and a soot displaying section 56.

Figure 12:
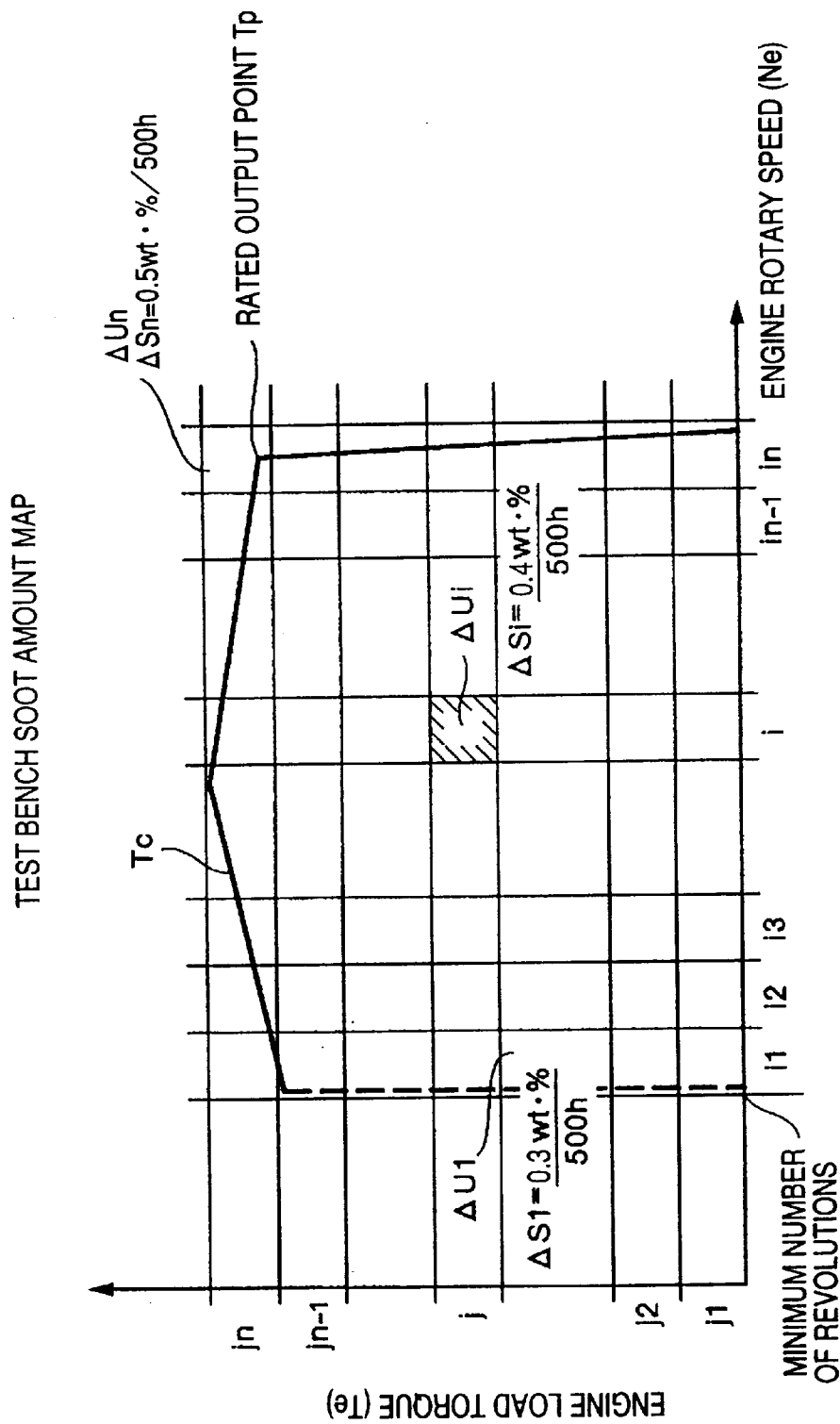
FIG. 12 is a map illustrating an amount of soot contained in the engine lubricating oil on a test bench according to the present invention.

The soot amount storing section 51 determines and stores values representing an amount of soot per time for an engine driven on a test bench. The soot amount storing section 51 operates in a same manner as the total acid value storing section 41. At this point, as shown in FIG. 12, in the soot amount storing section 51, an engine rotary speed (Ne) is on the abscissa axis, an engine load torque (Te) is on the ordinate axis, and an torque curve ($T_c$) of the engine is illustrated. The inside area of torque curve ($T_c$) is divided. A soot amount (Sot) per time is determined for each division ($\Delta$U), and the divisions are stored to form a test bench soot amount map.

The engine rotary speed (Ne) on the abscissa axis is divided between i1 to in, and the engine load torque (Te) on the ordinate axis is divided between j1 to jn. A change rate ($\Delta$S, wt %/h) of the amount of soot is determined for each division ($\Delta$U). For example, for a bench test, a value of 0.5 wt %/500 h is determined and stored in a division $\Delta$Un(in, jn), in which a rated output point (Tp) of the engine is entered; a value of 0.4 wt %/500 h is determined and stored in a division $\Delta$Ui(i, j); and a value of 0.3 wt %/500 h is determined and stored in a division $\Delta$U1(i1, j). In this manner, a change rate of the amount of soot ($\Delta$S) is determined for all the divisions on the test bench. The amount of soot for the bench test is determined at a fixed coolant temperature (for example, water at 85° C.) and at a fixed oil temperature (for example, 100° C.) of the lubricating oil while driving the engine for a given time (for example, 20 hours) for each division. The divisions (ΔU) for this embodiment may differ from the divisions of the first embodiment. If the divisions are the same, however, data in the bench test can be easily collected.

Figure 13:
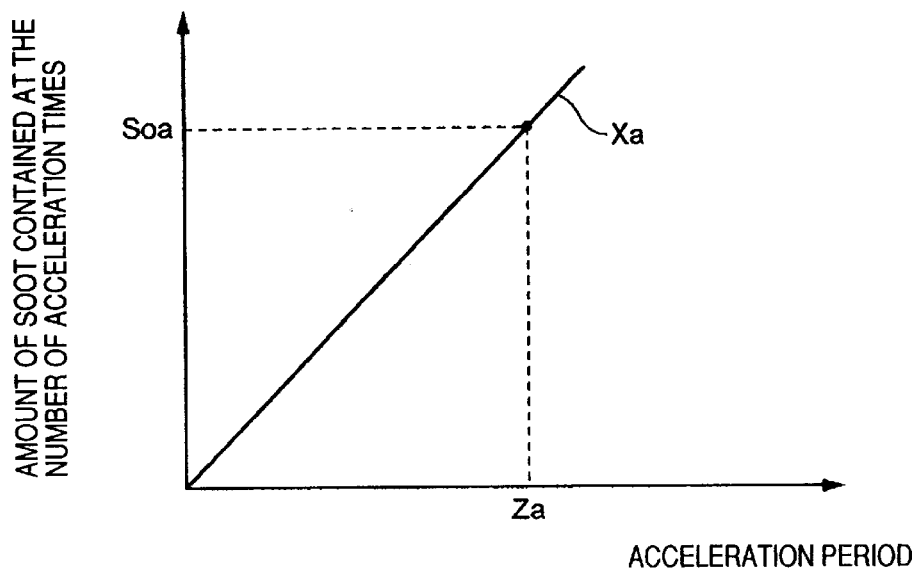
FIG. 13 is a diagram illustrating an amount of soot contained in the engine lubricating oil during rapid acceleration on a test bench according to the present invention.

The rapid acceleration soot amount storing section 52 determines and stores the amount of soot contained within the lubricating oil at that time by means of the amount of soot at the number of acceleration times for an engine on a test bench subject to rapid acceleration. For example, a degree of the acceleration is represented by an acceleration period, in other words, a time period before the rotary speed becomes stable. As shown in FIG. 13, the rapid acceleration soot amount storing section determines and stores a correlation between the acceleration period and the amount of soot at the number of acceleration times. In FIG. 13, an acceleration period, in other words, a time period before the rotary speed becomes stable is on the abscissa axis and an amount of soot contained in the lubricating oil at the predetermined number of acceleration times is on the ordinate axis. For example, in an acceleration period (Za), the rapid acceleration soot amount storing section 52 determines a solid line Xa which indicates a lubricating oil soot content amount (Soa) at 100 times the number of acceleration times and stores it as a chart of a test bench rapid acceleration soot amount.

The rapid acceleration frequency storing section 53 calculates and stores a frequency for the diesel engine subject to rapid acceleration during the operation of the actual machine. At this point, the rapid acceleration frequency storing section 53 receives a change from the engine rotary speed sensor 31, determines a time between the beginning of the acceleration and the stabilization of the revolution, measures frequencies to the acceleration period for a fixed period, and stores the values in a rapid acceleration frequency graph.

The soot amount calculating section 54 calculates an amount of soot accumulated in the lubricating oil during the operation of the actual machine for a given time. At this point, the soot amount calculating section 54 determines a given operating time soot amount (Sta) accumulated in the lubricating oil for each division for a given operating time of the actual machine based on both the test bench soot amount map (FIG. 12) stored in the soot amount storing section 51 and the operating time map by loads (FIG. 6) for a predetermined time (for a given operating time of the actual machine) determined by the operating load frequency calculating section 44. In addition, the soot amount calculating section 54 determines a given operating time rapid acceleration soot amount (Stb) accumulated in the lubricating oil for each division during the operation of the actual machine for a given time based on the test bench rapid acceleration soot amount stored in the rapid acceleration soot amount storing section 52 and the rapid acceleration frequency graph stored in the rapid acceleration frequency storing section 53.

Furthermore, the soot amount calculating section 54 adds the given operating time soot amount (Sta) and the given operating time rapid acceleration soot amount (Stb) for each division to determine the total amount of soot for a given time (Sto).

The soot amount integrating section 55 receives the total soot amount (Sto) contained in the lubricating oil within a given time for a lubricating oil amount (La) of the diesel engine under operation and determines an accumulated total soot amount (STT) by combining the given time total soot amounts (STo).

Figure 14:
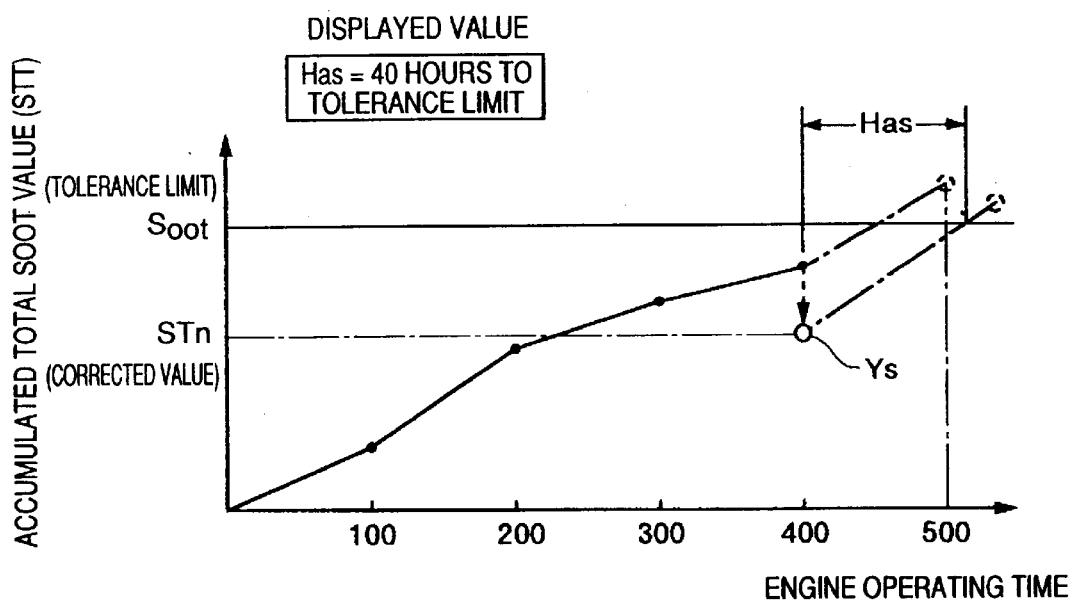
FIG. 14 is a diagram illustrating a displaying section for illustrating a soot amount displaying section for predicting a time when an oil soot content reaches a tolerance limit after comparing the determined soot content with the limit according to the present invention.

The soot displaying section 56 displays the accumulated total soot amount (STT) every given operating time (for example, 100 hours) of the actual machine and displays a threshold value (Soot) which is a tolerance limit of the accumulated total soot amount (STT). At this point, as shown in FIG. 14, the soot displaying section 56 continuously displays the accumulated total soot amount (STT) determined by the soot amount integrating section 55 for every given operating time of the actual machine and displays how many hours (Ha) will elapse before the accumulated total soot amount (STT) reaches the threshold value (Soot) which is a tolerance limit. By this function, the working life of the lubricating oil can be predicted, and a new lubricating oil can be prepared for the engine.

Figure 15:
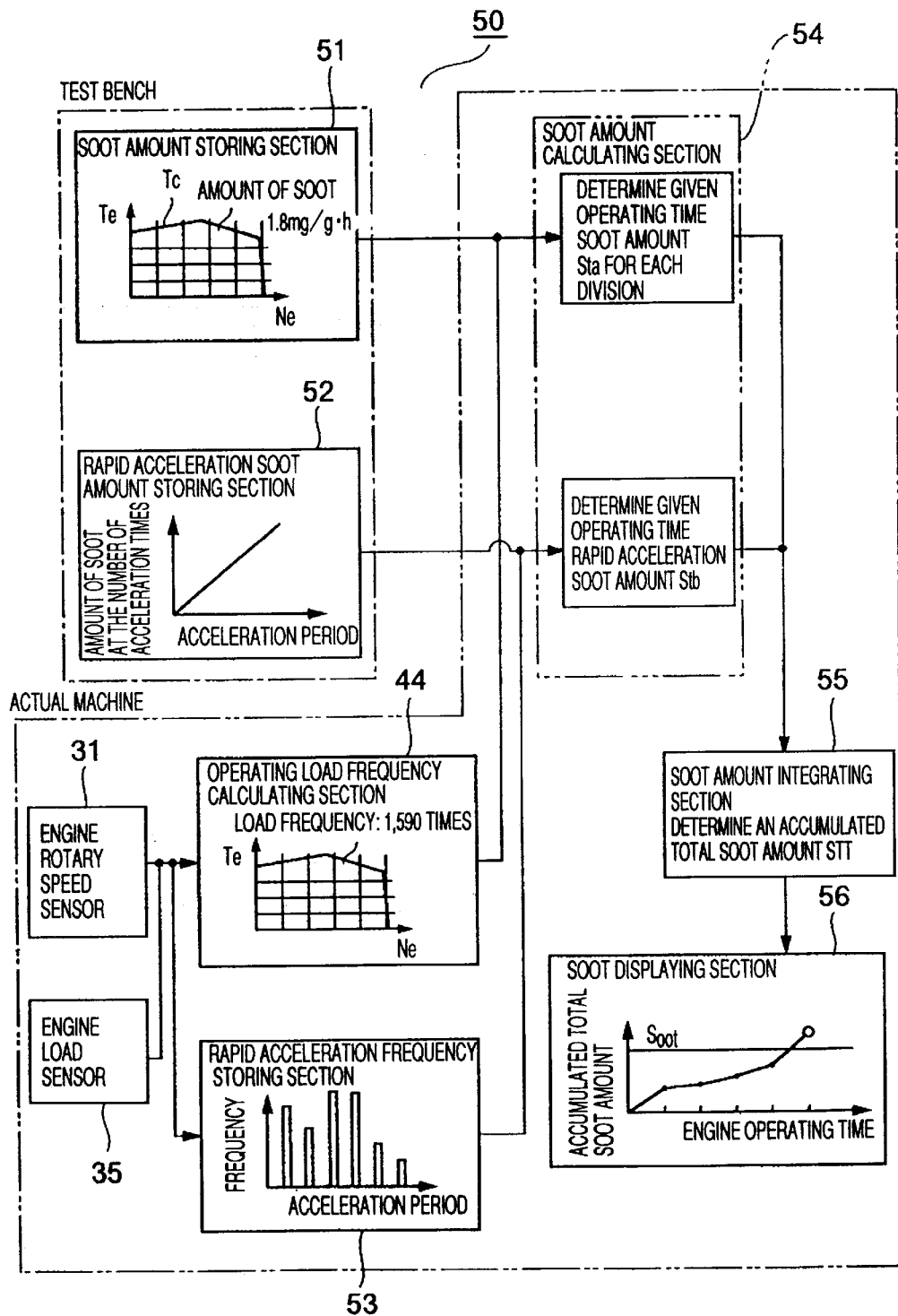
FIG. 15 is a block diagram of an engine lubricating oil replacement time predicting apparatus in accordance with a second embodiment of the present invention to determine an oil soot content.
Figure 16:
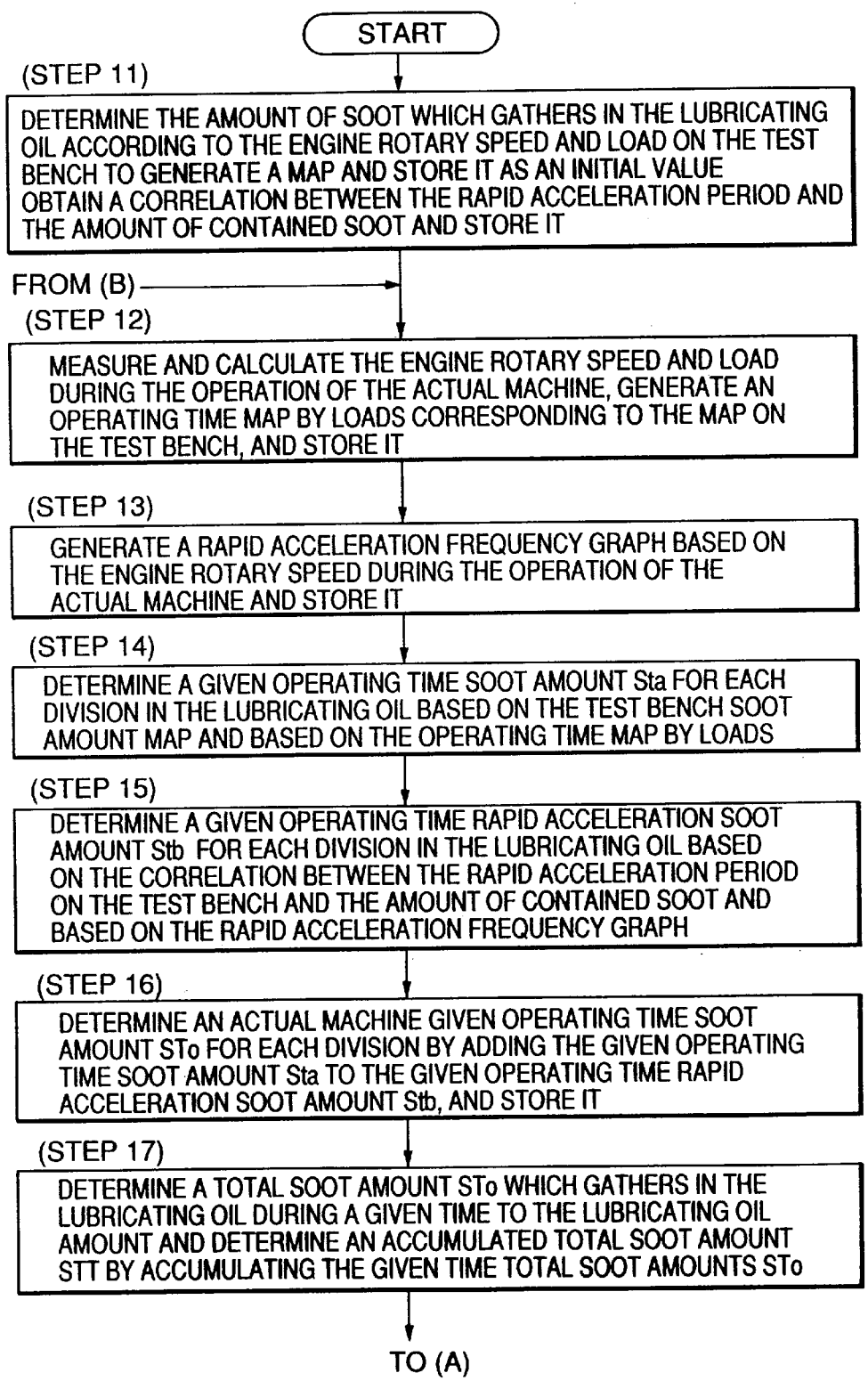
FIGS. 16 and 17 are flowcharts illustrating steps of determining the oil soot content for the prediction according to the second embodiment of the engine lubricating oil replacement time predicting apparatus of FIG. 15.
Figure 17:
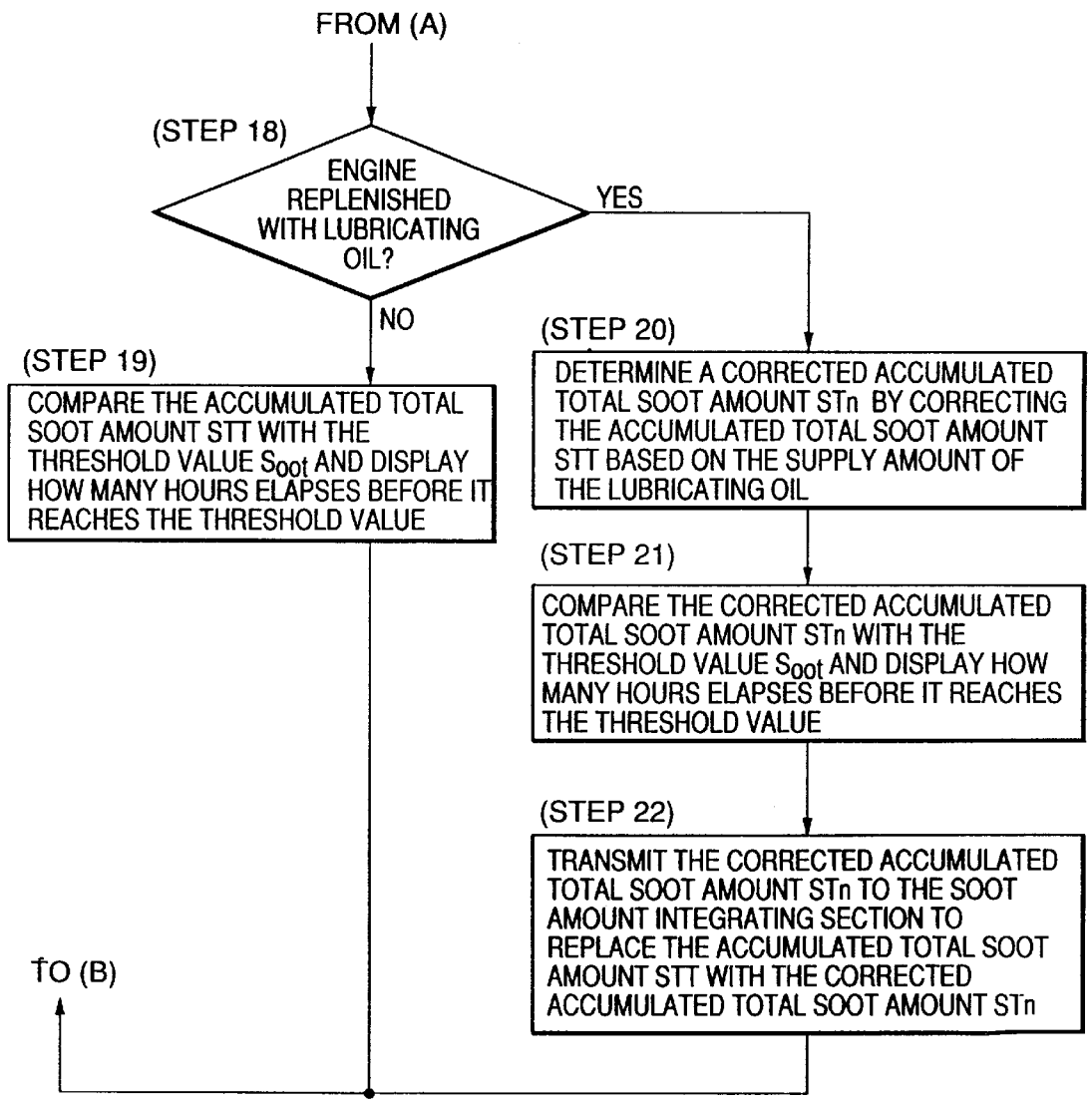
Figure 9:
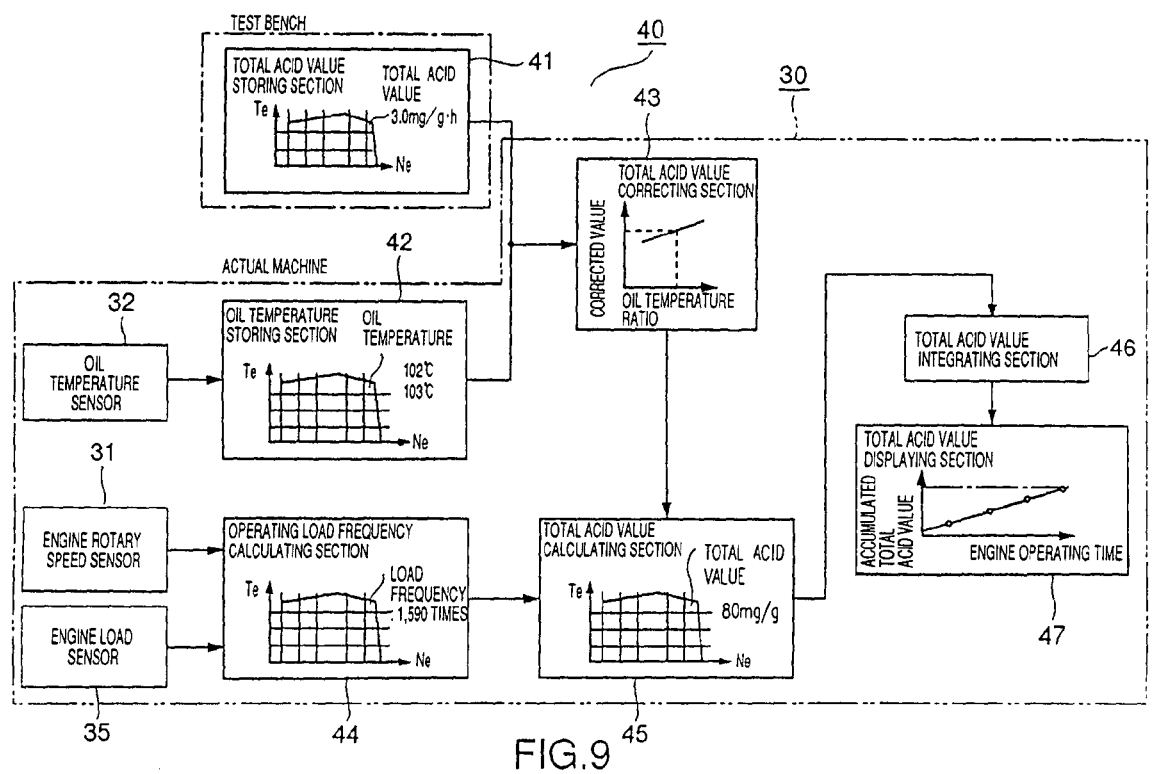
Figure 13:
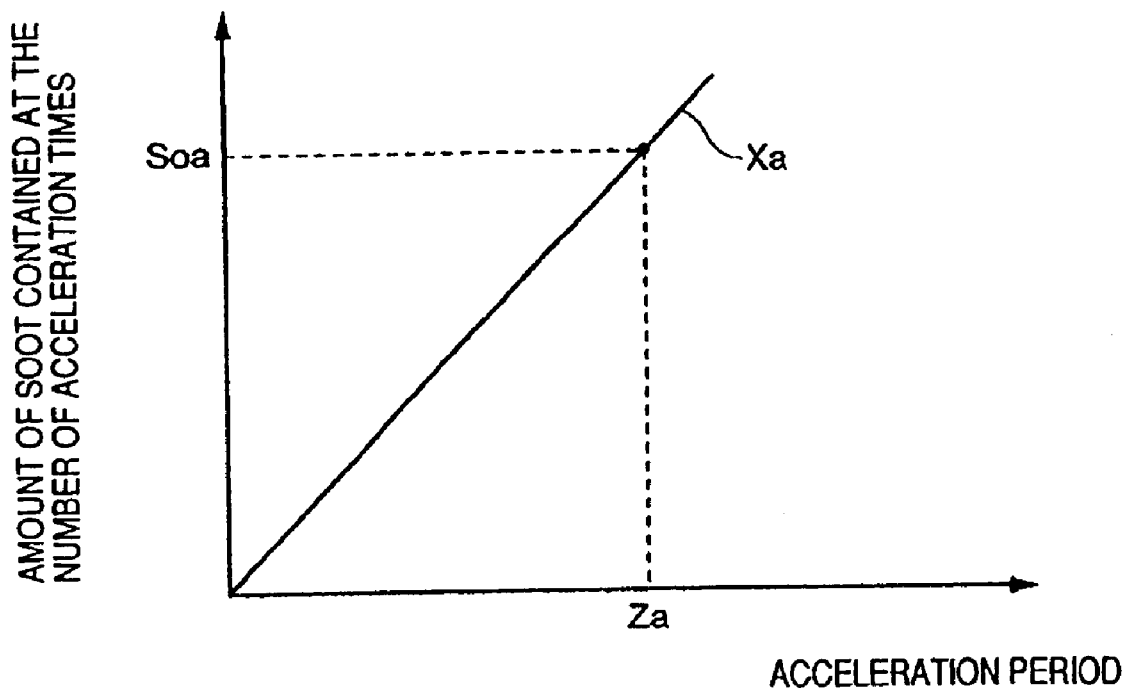
Figure 14:
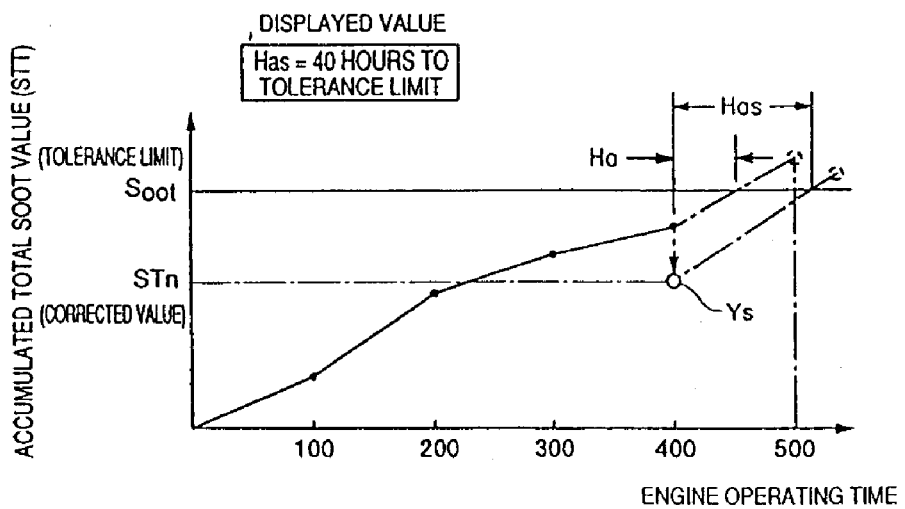
Figure 16:
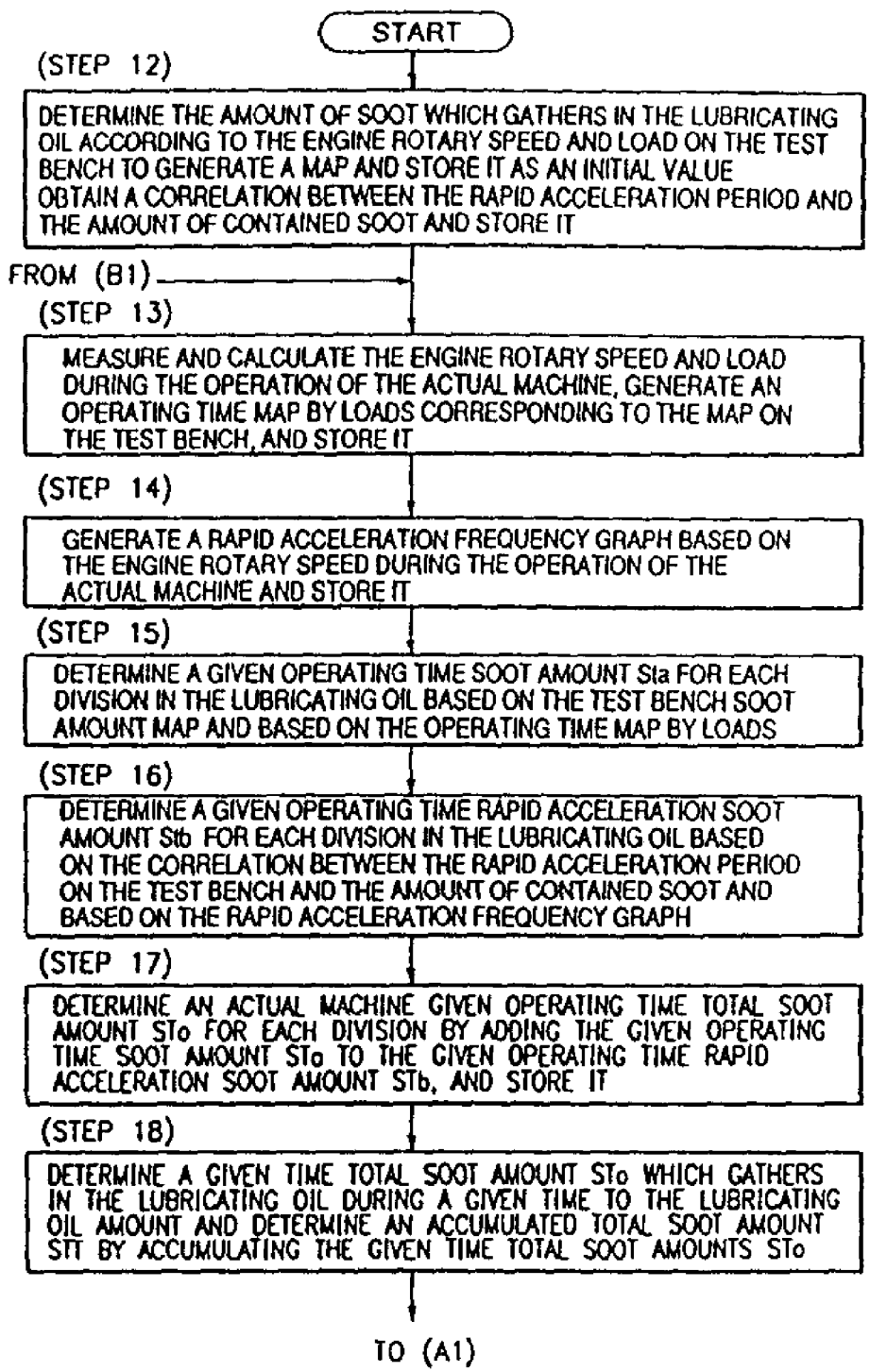
Figure 17:
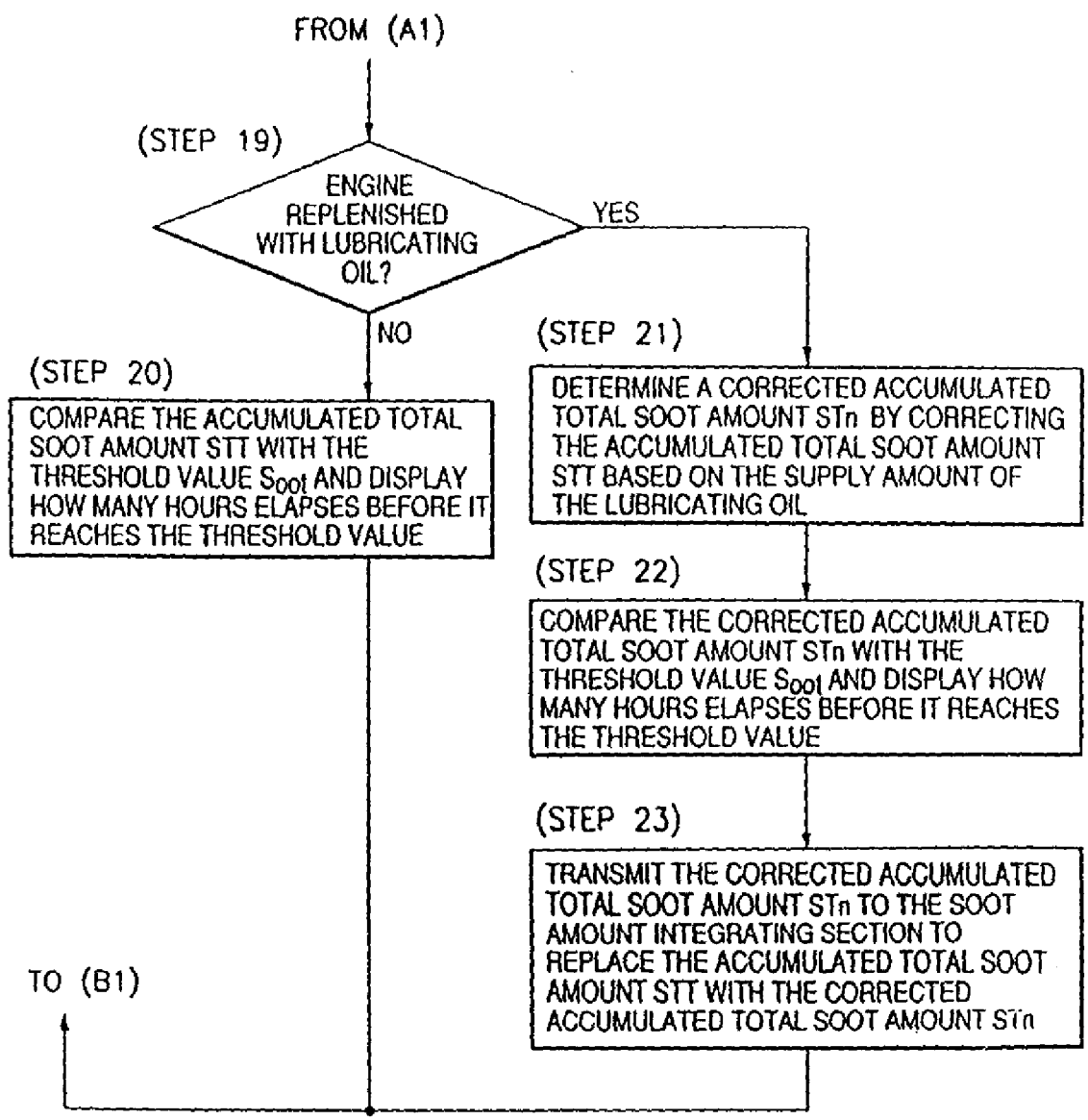

Next, referring to a block diagram in FIG. 15 and flowcharts in FIGS. 16 and 17, an explanation will be made below for a method of predicting the replacement timing for determining an amount of soot according to the second embodiment of the engine lubricating oil replacement time predicting apparatus 50.

In step 12, in the soot amount storing section 51 and the rapid acceleration soot amount storing section 52 of the control section 30, the test bench soot amount map (FIG. 12) determined for each engine on the test bench and the chart illustrating a relationship between the rapid acceleration period and the contained soot amount on the test bench (FIG. 13) are respectively entered and stored as initial values.

In step 13, a received load frequency on the engine under operation is received. The operating frequency calculating section 44 calculates a load (load torque) on the engine based on signals from the engine load sensor 35 (rack position sensor 22) and the engine rotary speed sensor 31 and determines the load frequency (W) for each division. Furthermore, on the basis of the load frequency (W), it determines the operating time (Hw) ((Hw)=load frequency (W)×sampling interval (Tt)) which indicates how many hours will elapse in each division of the actual machine for a given time and stores these values as the operating time map by loads (FIG. 6).

In step 14, a rapid acceleration frequency applied to the diesel engine which is running is received. The rapid acceleration frequency storing section 53 determines a time between the beginning of the acceleration and the stabilization of the revolution based on a signal from the engine rotary speed sensor 31, determines a frequency for a given time, and then stores the values as a rapid acceleration frequency graph.

In step 15, a calculation is made to determine an amount of soot which gathers in the lubricating oil driving the normal operation when the engine speed is less variable for a given operating time of the actual machine. The soot amount calculating section 54 determines a given operating time soot amount (Sta) which accumulates in the lubricating oil for each division for a given operating time of the actual machine, based on both the test bench soot amount map (FIG. 12) stored in the soot amount storing section 51 and the operating time map by loads (FIG. 6) for a given time (for a given operating time of the actual machine) determined by the operating load frequency calculating section 44.

In step 16, a calculation is made to determine an amount of soot which accumulates in the lubricating oil during rapid acceleration for a given operating time of the actual machine. The soot amount calculating section 54 determines a given operating time rapid acceleration soot amount (Stb) which accumulates in the lubricating oil for a division for a given operating time of the actual machine, based on both the test bench rapid acceleration soot amount (FIG. 13) stored in the rapid acceleration soot amount storing section 52 and based on the rapid acceleration frequency graph stored in the rapid acceleration frequency storing section 53.

In step 17, a calculation is made to determine an amount of soot accumulated in the lubricating oil for a given operating time of the actual machine. The soot amount calculating section 54 adds the given operating time soot amount (Sta) and the given operating time rapid acceleration soot amount (Stb) for each division to determine an amount of soot contained in the lubricating oil for each division as an actual machine given operating time soot amount (Sto) and stores the value.

In step 18, a calculation is made to determine a given time total soot amount (STo) which accumulates in the lubricating oil during a given time for a lubricating oil amount (La) of the engine which is running and to determine an accumulated total soot amount (STT) by adding the given time total soot amounts (STo). The soot amount integrating section 55 determines the given time total soot amount (STo) by integrating the actual machine given operating time total soot amount (Sto) which indicates an amount of soot accumulated in the lubricating oil for each division during a given operating time of the actual machine using the actual machine given operating time soot amount map which has been determined for each division and stored by the soot amount calculating section 54. The soot amount integrating section 55 further integrates the given time total soot amounts (STo) to determine the accumulated total soot amount (STT).

In step 19, it is judged whether or not the diesel engine is replenished with a lubricating oil. The control section 30 receives a signal from the lubricating oil amount sensor 33, judges whether or not the engine is replenished with a lubricating oil amount, and then detects a lubricating oil supply amount (Ln).

If the engine is not replenished with the lubricating oil supply amount (Ln), the control progresses to step 20.

In step 20, it is judged whether or not the ratio of the accumulated total soot amount (STT) to the lubricating oil amount (La) (i.e., an unreplenished amount of lubricating oil) is greater than the threshold value (Soot) which is a tolerance limit. It is further displayed how many hours will elapse before the accumulated total soot amount (STT) reaches the threshold value (Soot).

If the engine is replenished with a lubricating oil of the amount, the control progresses to step 21.

In step 21, the control section 30 determines a corrected accumulated total soot amount (STn) by correcting the accumulated total soot amount (STT) based on the total oil amount (LA) of engine lubricating oil (i.e., the combination of the unreplenished amount of lubricating oil (La) with a lubricating oil supply amount (Ln)). The corrected accumulated total soot amount (STn) is indicated by a point Ys (as shown in FIG. 14).

In step 22, it is judged whether or not the ratio of the accumulated soot amount (STT) for the total oil amount (LA) of the lubricating oil is greater than the threshold value (Soot). The number of hours that will elapse before the corrected accumulated total soot amount (STn) reaches the threshold value (Soot) are displayed. By this function, it becomes possible to judge a degree of deterioration of the lubricating oil caused by soot.

In step 23, the corrected accumulated total soot amount (STn) is transmitted to the soot amount integrating section 55 in which the conventional accumulated total soot amount (STT) is replaced with the corrected accumulated total soot amount (STn). The "new" accumulated total soot amount (STT) is used for the lubricating oil under operation. Control then returns to step 12.

In the first and second embodiments, the calculating section is separated from the integrating section in the description set forth above, however, it shall be understood that these calculations may be performed in an identical calculating section.

Next, an explanation will be made below for a replacement time prediction in accordance with a third embodiment of an engine lubricating oil replacement time predicting apparatus. Specifically, the third embodiment judges which one of a total acid value and a total amount of soot will reach a threshold value. The same components as for the first and second embodiments are designated by the same reference numerals; therefore, redundant explanation will not be provided here.

This apparatus includes a total acid value storing section 41 for predicting a replacement time using a total acid value (similar to the first embodiment), a total acid value correcting section 43, an operating load frequency calculating section 44, a total acid value calculating section 45, and a total acid value integrating section 46. Furthermore, the apparatus includes a soot amount storing section 51 for predicting a replacement time using a lubricating oil soot content (similar to the second embodiment), a rapid acceleration soot amount storing section 52, a rapid acceleration frequency storing section 53, a soot amount calculating section 54, and a soot amount integrating section 55. The apparatus yet further includes a displaying section having a total acid value displaying section 47 and a soot displaying section 56.

In this configuration, the total acid value and soot displaying section display a total acid value or an amount of soot determined by the total acid value integrating section 46 or the soot amount integrating section 55. The apparatus judges whether the total acid value and the amount of soot will reach the threshold value and how many hours will elapse before the values reach the threshold value so as to predict a lubricating oil replacement time.

What is claimed is:

1. An engine lubricating oil replacement time predicting apparatus for predicting a replacement timing of a lubricating oil for an engine in a vehicle, the apparatus comprising:

an engine rotary speed sensor to detect an engine rotary speed;

an engine load sensor to detect an engine load;

an initial value storage portion to store changes in a lubricating oil total acid value per unit time corresponding to an engine rotary speed and an engine load, wherein the changes in the lubricating oil total acid value are without regard to the vehicle;

an operating load frequency calculator, coupled to the engine rotary speed sensor and the engine load sensor, to calculate an engine load frequency for a set period after receiving signals from the engine rotary speed sensor and the engine load sensor in regard to the vehicle;

a total acid value calculator, coupled to the initial value storage portion and the operating load frequency calculator, to calculate an output equal to a change in a total lubricating oil acid value for a set period based on data stored in the initial value storage portion and based on the engine load frequency calculated by the operating load frequency calculator; and a display, coupled to the total acid value calculator, to display a time when a total lubricating oil acid value, based on the output of the total acid value calculator, will exceed a predetermined threshold value.

2. An apparatus of claim 1, further comprising a total acid value accumulator, coupled between the total acid value calculator and the display, to receive a plurality of outputs from the total acid value calculator, sum the plurality of outputs, and output a sum to the display.

3. An apparatus of claim 1, wherein the initial value storage portion stores the engine rotary speed in relation to the engine load as a map.

4. An apparatus of claim 3, wherein the operating load frequency calculator stores the engine load frequency with respect to the map.

5. An apparatus of claim 1, further comprising:

an oil temperature sensor to detect a lubricating oil temperature of the engine in the vehicle, and an oil temperature storing portion, coupled to the oil temperature sensor, to measure and store oil temperature values after receiving signals from the engine rotary speed sensor and the engine load sensor, wherein the oil temperature storing portion is coupled to the total acid value calculator, and the oil temperature values influence calculations of the total acid value calculator.

6. An apparatus of claim 5, wherein the initial value storage portion stores the engine rotary speed in relation to the engine load as a first map.

7. An apparatus of claim 6, wherein the oil temperature values are stored in a second map in accordance with the first map.

8. An apparatus of claim 5, further comprising a correction portion, coupled to the initial value storage portion, the oil temperature storing portion, and the total acid value calculator, to correct the changes in a lubricating oil total acid value per unit time stored in the initial value storage portion in accordance with corresponding oil temperatures stored in the oil temperature storing portion, wherein a corrected output from the correction portion is output to the total acid value calculator.

9. An apparatus of claim 1, further comprising:

a second initial value storage portion to store changes in a lubricating oil soot content per unit time corresponding to an engine rotary speed and an engine load, wherein the changes in the lubricating oil soot content are without regard to the vehicle; and a total soot content calculator, coupled to the second initial value storage portion and the operating load frequency calculator, to calculate a first output equal to a change in a total lubricating oil soot content for a set period based on data stored in the second initial value storage portion and based on the engine load frequency calculated by the operating load frequency calculator, wherein the display further displays a time when a total lubricating oil soot content, based on the first output of the total soot content calculator, will exceed a predetermined threshold value.

10. An apparatus of claim 9, further comprising:

a third initial value storage portion to store lubricating oil soot content amounts corresponding to rapid acceleration of the engine without regard to the vehicle, and a rapid acceleration frequency storage portion, coupled to the engine load sensor, to calculate and to store an engine rapid acceleration frequency and an engine rapid acceleration degree after receiving signals from the engine load sensor and in regard to the vehicle, wherein both the third initial value storage portion and the rapid acceleration frequency storage portion are coupled to the total soot content calculator, wherein the total soot content calculator further calculates a second output equal to a change in a total lubricating oil soot content for a set period based on data stored in the third initial value storage portion and based on the data stored in the rapid acceleration frequency storage portion and supplies both the first output and the second output to the display.

11. An engine lubricating oil replacement time predicting apparatus for predicting a replacement timing of a lubricating oil for an engine in a vehicle, the apparatus comprising:

an engine rotary speed sensor to detect an engine rotary speed;

an engine load sensor to detect an engine load;

at least one initial value storage portion to store changes in a lubricating oil soot content per unit time corresponding to an engine rotary speed and an engine load, wherein the changes in the lubricating oil soot content are without regard to the vehicle;

an operating load frequency calculator, coupled to the engine rotary speed sensor and the engine load sensor, to calculate an engine load frequency in regard to the vehicle for a set period after receiving signals from the engine rotary speed sensor and the engine load sensor;

a total soot content calculator, coupled to the at least one initial value storage portion and the operating load frequency calculator, to calculate a first output equal to a change in a total lubricating oil soot content for a set period based on data stored in the at least one initial value storage portion and based on the engine load frequency calculated by the operating load frequency calculator; and a display, coupled to the total soot content calculator, to display a time when a total lubricating oil soot content, based on the first output of the total soot content calculator, will exceed a predetermined threshold value.

12. An apparatus of claim 11, further comprising a total soot content accumulator, coupled between the total soot content calculator and the display, to receive a plurality of first outputs from the total soot content calculator, sum the plurality of first outputs, and output a sum to the display.

13. An apparatus of claim 11, wherein the initial value storage portion stores the engine rotary speed in relation to the engine load as a map.

14. An apparatus of claim 13, wherein the operating load frequency calculator stores the engine load frequency with respect to the map.

15. An apparatus of claim 11, further comprising:

a second initial value storage portion to store lubricating oil soot content amounts corresponding to rapid acceleration of the engine without regard to the vehicle, and a rapid acceleration frequency storage portion, coupled to the engine load sensor, to calculate and to store an engine rapid acceleration frequency and an engine rapid acceleration degree after receiving signals from the engine load sensor and in regard to the vehicle, wherein both the second initial value storage portion and the rapid acceleration frequency storage portion are coupled to the total soot content calculator, wherein the total soot content calculator further calculates a second output equal to a change in a total lubricating oil soot content for a set period based on data stored in the second initial value storage portion and based on the data stored in the rapid acceleration frequency storage portion and supplies both the first output and the second output.

16. A method for predicting a replacement time of an engine lubricating oil corresponding to an engine rotary speed and an engine load for an engine in a vehicle, the method comprising the steps of:

storing changes in a total lubricating oil acid value per unit time corresponding to an engine rotary speed and an engine load without regard to the vehicle;

calculating and storing an engine load frequency for a set period based on said engine rotary speed and on said engine load and in regard to the vehicle;

calculating a total lubricating oil acid value change for a set period based on the stored changes in a total lubricating oil acid value per unit time and the stored engine load frequency; and displaying a time indication representative of a total lubricating oil acid value with respect to a predetermined threshold value, wherein the total lubricating oil acid value equals a sum of total lubricating oil acid value changes.

17. A method in accordance with claim 16, wherein the engine rotary speed is stored in relation to the engine load as a map, and the engine load frequency is stored with respect to the map.

18. A method in accordance with claim 16, further comprising the steps of:

storing changes of a lubricating oil soot content per unit time corresponding to an engine rotary speed and an engine load without regard to the vehicle;

calculating a lubricating oil soot content change for a set period based on the stored changes of a lubricating oil soot content per unit time and the stored engine load frequency; and displaying a time indication representative of a total lubricating oil soot content change with respect to a predetermined threshold value, wherein the total lubricating oil soot content equals a sum of total lubricating oil soot content changes.

19. A method for predicting a replacement time of an engine lubricating oil corresponding to an engine rotary speed and an engine load for an engine in a vehicle, the method comprising the steps of:

storing changes of a lubricating oil soot content per unit time corresponding to an engine rotary speed and an engine load without regard to the vehicle;

calculating and storing an engine load frequency in regard to the vehicle for a set period based on an engine rotary speed and an engine load;

calculating a first lubricating oil soot content change for a set period based on the stored changes of a lubricating oil soot content per unit time and the stored engine load frequency; and displaying a time indication representative of a total lubricating oil soot content change with respect to a predetermined threshold value, wherein the total lubricating oil soot content equals a sum of first lubricating oil soot content changes.

20. A method in accordance with claim 19, further comprising the steps of:

storing changes of a lubricating oil soot content per unit time corresponding to an engine rotary speed and an engine load when the engine is subject to rapid acceleration and without regard to the vehicle;

calculating and storing an engine load frequency when the engine is subject to rapid acceleration, with regard to the vehicle, based on an engine rotary speed and an engine load;

calculating a second lubricating oil soot content change for a set period based on the stored changes of a lubricating oil soot content gained from rapid acceleration of the engine and the stored engine load frequency gain from rapid acceleration of the engine; and calculating a total lubricating soot content amount for a set period by combining the first lubricating oil soot content change and the second lubricating oil soot content change.

* * * * *

UNITED STATES PATENT AND TRADEMARK OFFICE
CERTIFICATE OF CORRECTION

PATENT NO.   : 5,969,601
DATED        : October 19, 1999
INVENTOR(S)  : Fumihide Sato et al.

It is certified that error appears in the above-identified patent and that said Letters Patent is hereby corrected as shown below:

<u>Drawings,</u>
Delete drawing sheet Figures 9, 14, 16 and 17 and substitute therefore the drawing sheets, consisting of Figures 9, 14, 16 and 17 as shown on the attached pages.

Signed and Sealed this

First Day of April, 2003

JAMES E. ROGAN
*Director of the United States Patent and Trademark Office*